(12) United States Patent
Guenther

(10) Patent No.: US 6,318,941 B1
(45) Date of Patent: Nov. 20, 2001

(54) WALL ANCHOR

(75) Inventor: Torbett B. Guenther, 498 Farmer St., Plymouth, MI (US) 48170

(73) Assignees: Torbett B. Guenther; Dolores Guenther, both of Plymouth, MI (US)

( * ) Notice: Subject to any disclaimer, the term of this patent is extended or adjusted under 35 U.S.C. 154(b) by 0 days.

(21) Appl. No.: 09/620,699

(22) Filed: Jul. 20, 2000

(51) Int. Cl.$^7$ .................................................. F16B 21/00
(52) U.S. Cl. ............................ 411/342; 411/344; 411/345
(58) Field of Search .......................... 411/21, 340, 341, 411/342, 344, 345, 346

(56) References Cited

U.S. PATENT DOCUMENTS

| | | |
|---|---|---|
| 1,169,635 | 1/1916 | Grimes . |
| 1,181,336 | 5/1916 | Mutton . |
| 1,694,493 | 12/1928 | Tomkinson . |
| 3,005,645 | 10/1961 | Leverette . |
| 3,170,361 | 2/1965 | Vaughn . |
| 3,707,898 * | 1/1973 | Holly ..................................... 411/344 |
| 4,074,941 | 2/1978 | Jablonski . |
| 4,500,238 | 2/1985 | Vassiliou . |
| 4,704,057 | 11/1987 | McSherry . |
| 4,822,226 * | 4/1989 | Kennedy ............... 411/342 |
| 4,997,327 | 3/1991 | Cira . |
| 5,226,768 * | 7/1993 | Speer ................... 411/21 X |
| 5,412,848 | 5/1995 | Precourt, Jr. . |
| 5,417,531 | 5/1995 | Brown . |
| 5,749,687 * | 5/1998 | Kilgore, III ....................... 411/340 X |
| 6,036,149 * | 3/2000 | Del Pino et al. ................. 411/340 X |

* cited by examiner

*Primary Examiner*—Neill Wilson
(74) *Attorney, Agent, or Firm*—Reising, Ethington, Barnes, Kisselle, Learman & McCulloch, P.C.

(57) ABSTRACT

A fastening anchor assembly and manual method for fastening an object to a hollow wall. In most embodiments a generally U-shaped mounting strap of the assembly has a central bight and parallel first and second legs extending longitudinally from the bight through a first mounting hole in the wall. A strap foot portion or separate mounting flange extends perpendicularly to the legs for engaging the wall exterior side surface. One or two anchoring blades are operably pivotally coupled to the strap for swinging motion in a single plane defined by the longitudinal axes of the blades and strap and between a collapsed position nested adjacent the strap and a swung-out expanded position wherein the blade(s) clamp-engage the wall interior surface while the leg feet or flange clamp-engages the wall exterior surface. The position and orientation of the now wall-hidden blade remains visibly indicated to the installer by the orientation of the strap exposed to view of the installer. Preferably an operating screw-bolt is disposed between the strap legs and threadably drivingly engages the blade(s) such that screw rotation forces the blade(s) toward the wall interior surface for positioning the blade for mounting the anchoring assembly on the wall. The object is fastened to the wall with a separate load-carrying fastener member(s) that extends through a second mounting hole(s) in the wall and threadably engage the blade(s) so that the operating screw bolt is isolated from object-imposed forces and heavy loads can be reliably carried on the hollow wall via the overall anchoring assembly structure.

35 Claims, 9 Drawing Sheets

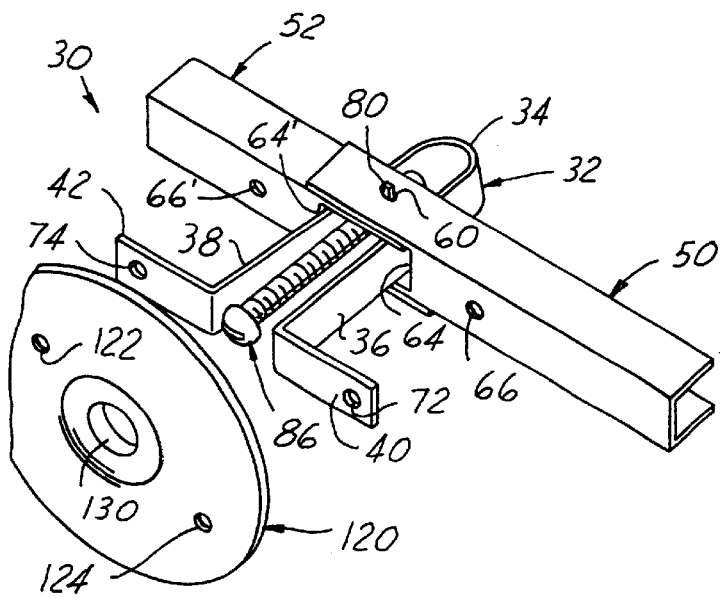
FIG. 1
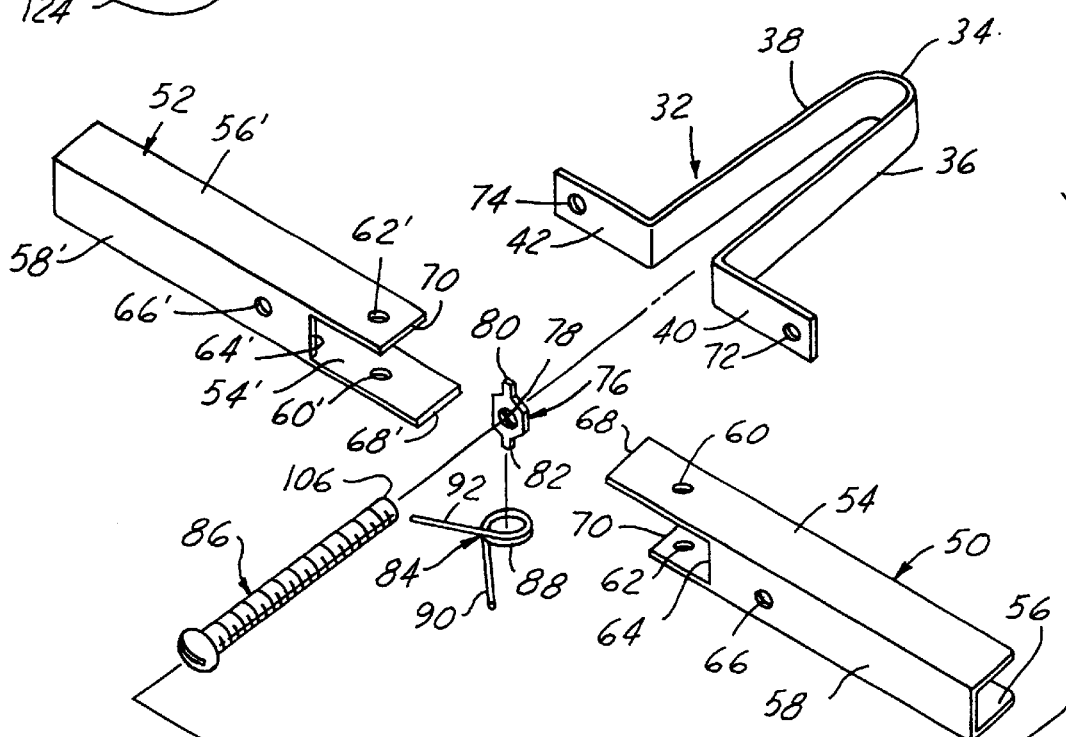
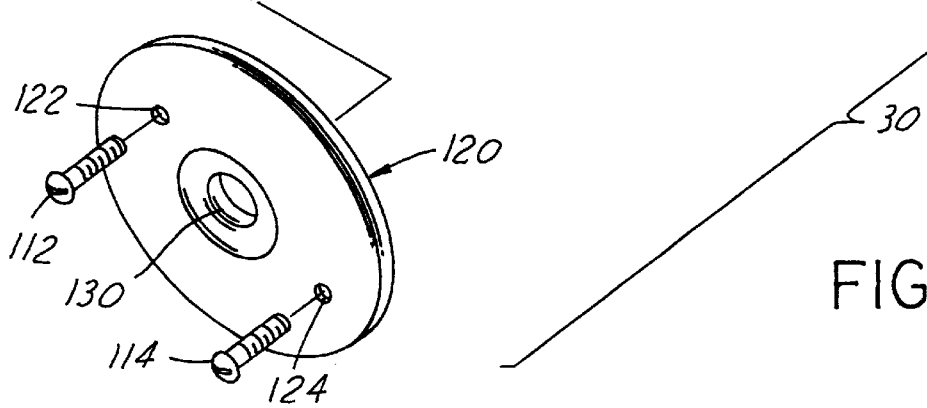
FIG. 2

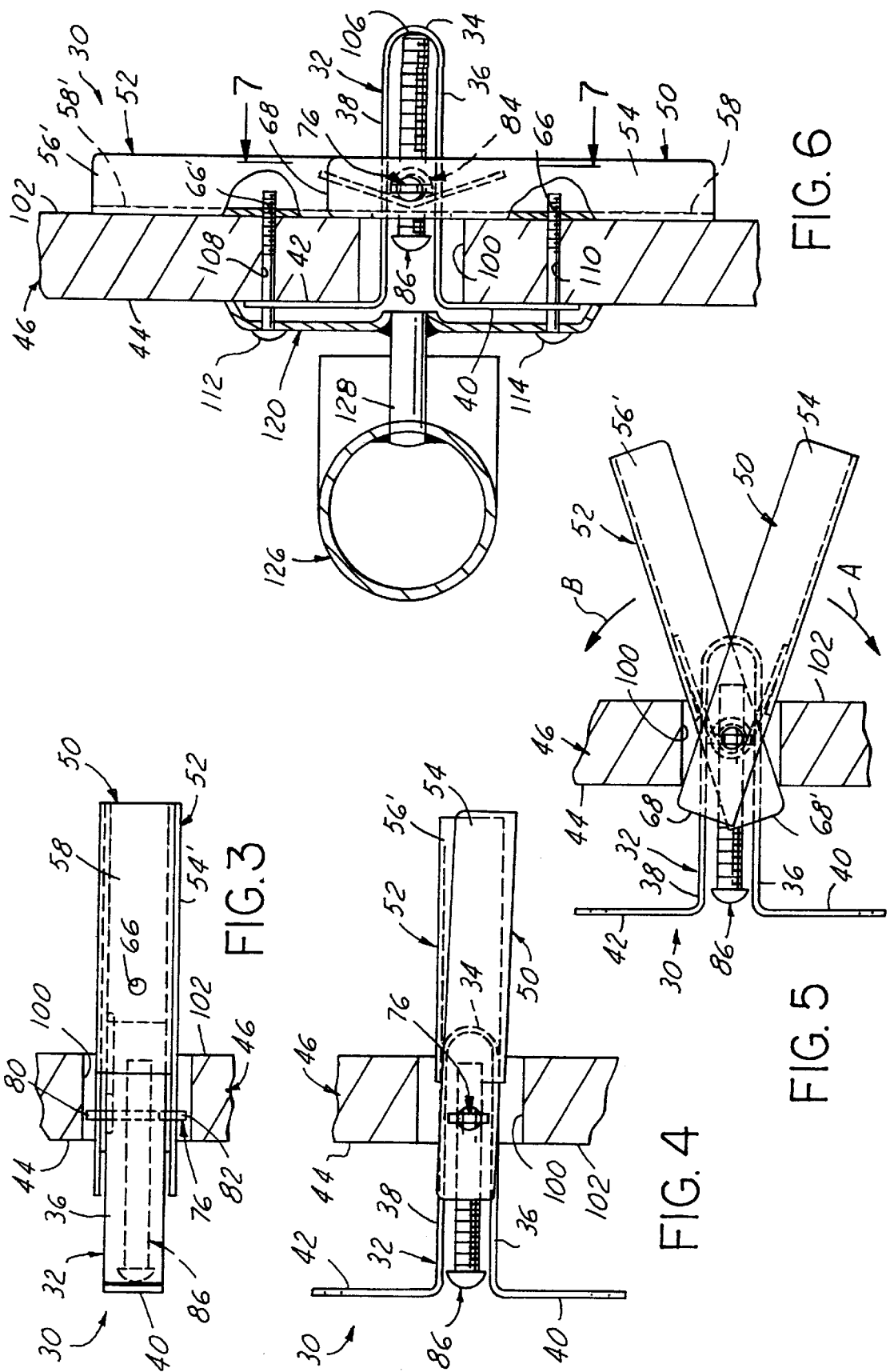

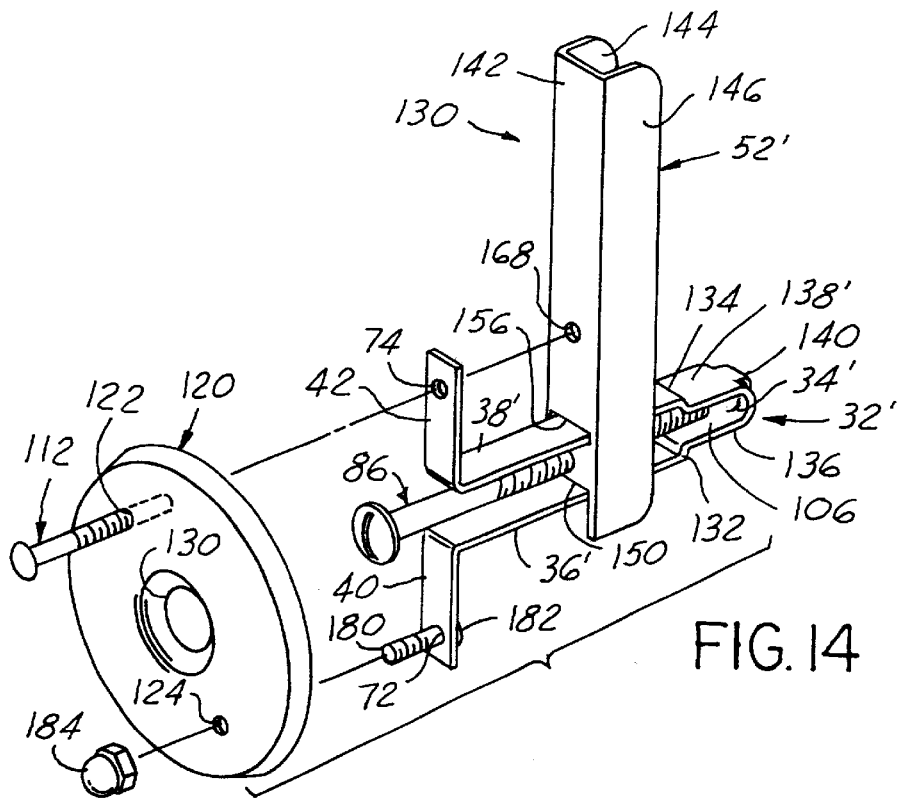
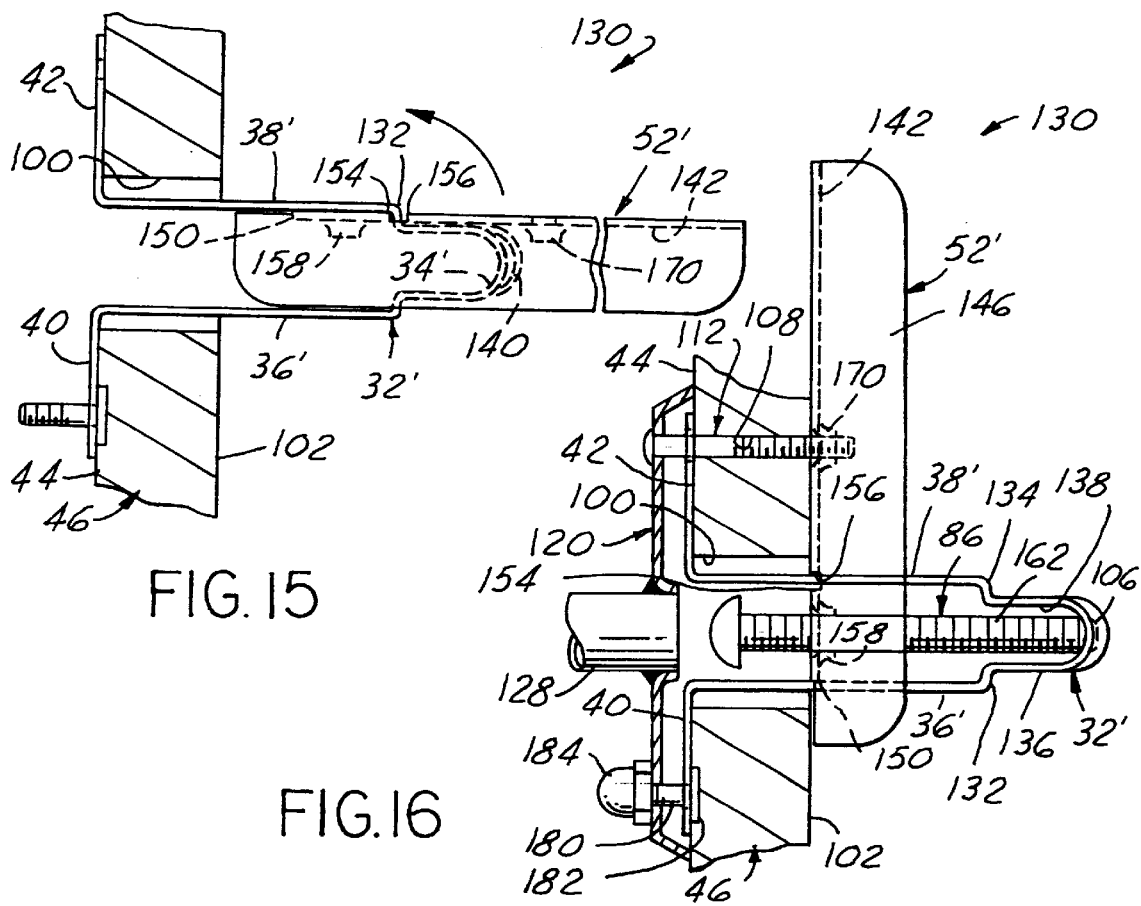

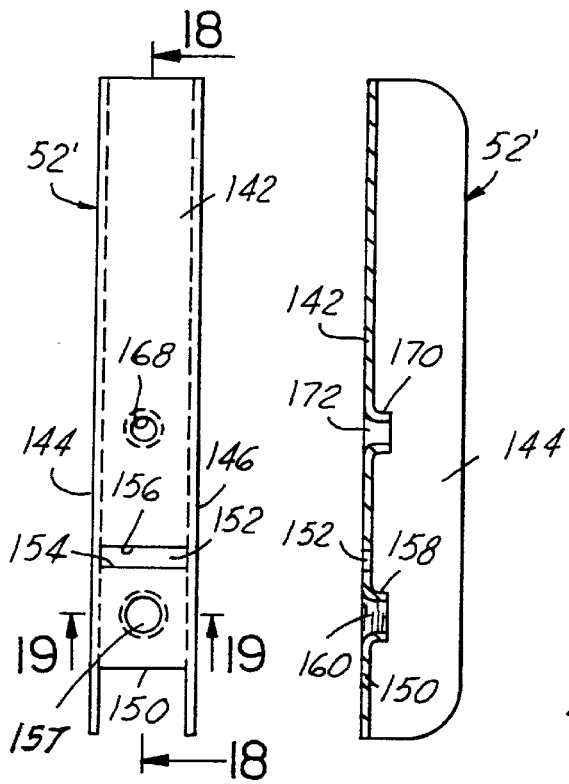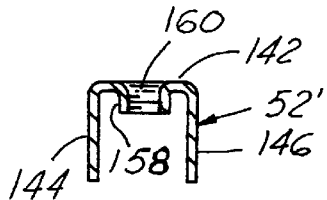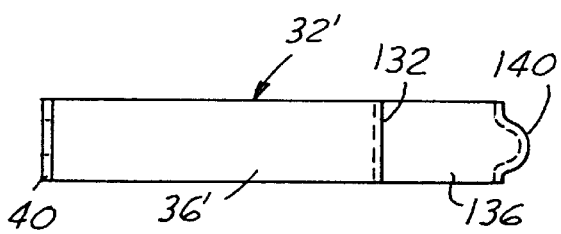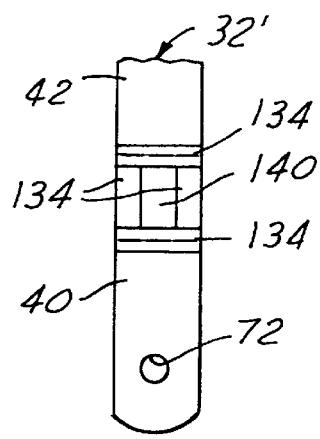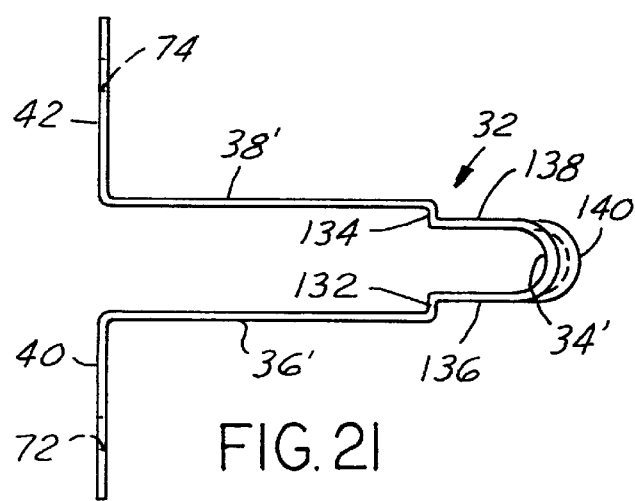

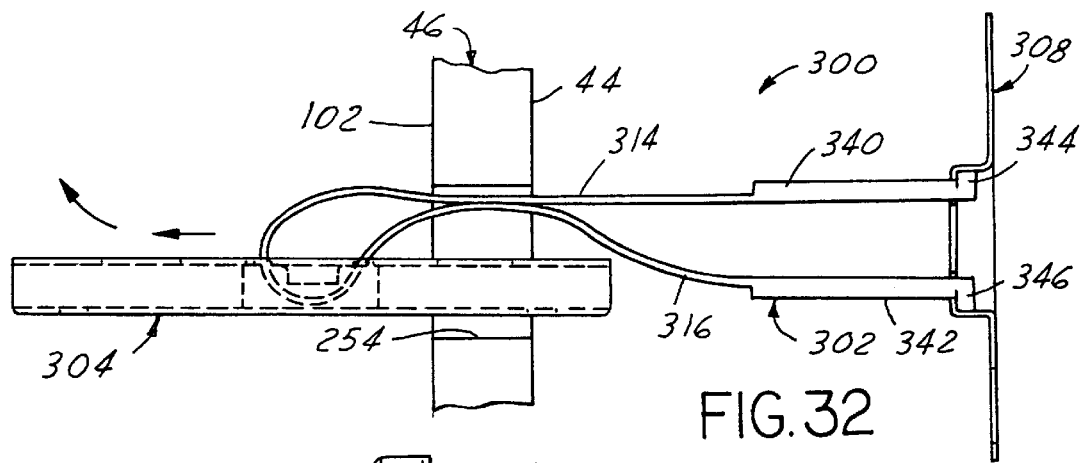
FIG. 32
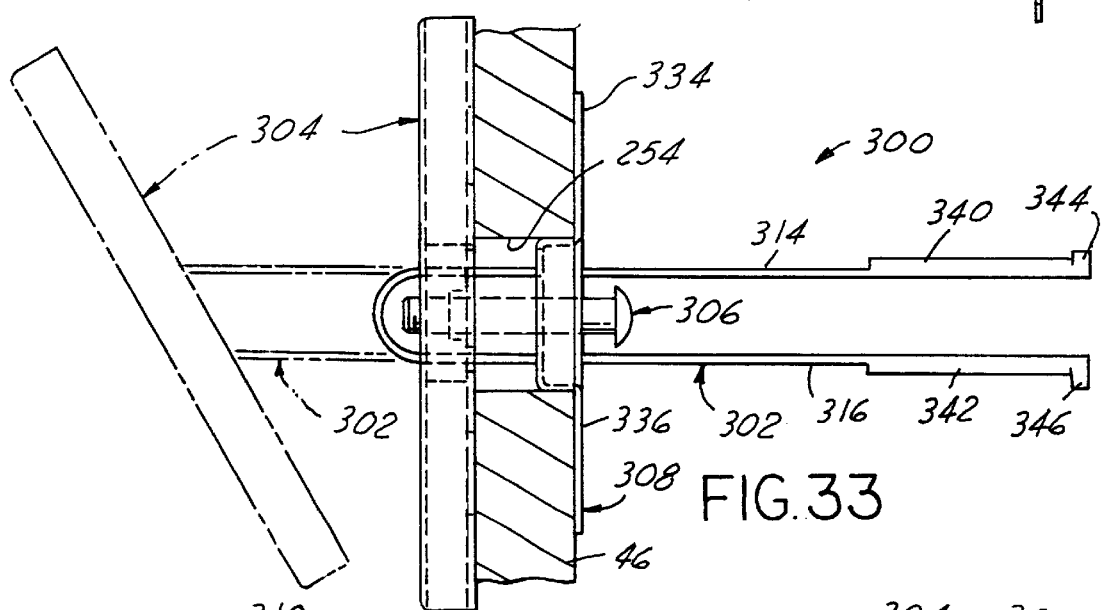
FIG. 33
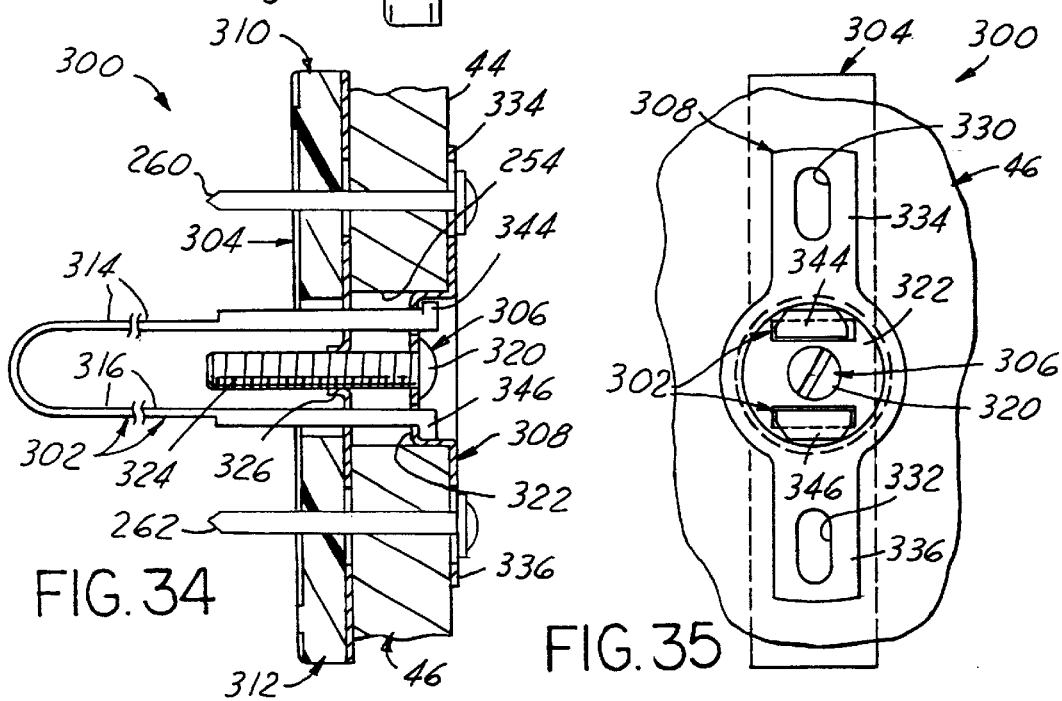
FIG. 34
FIG. 35

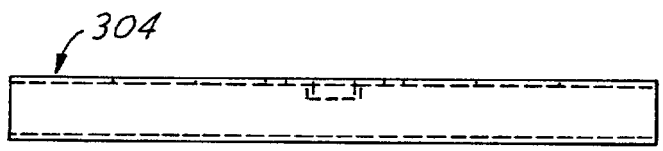
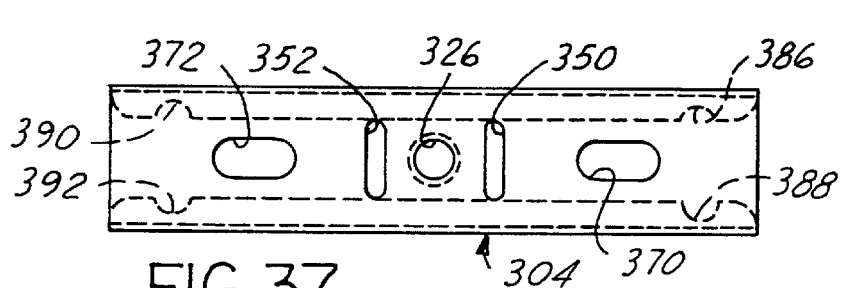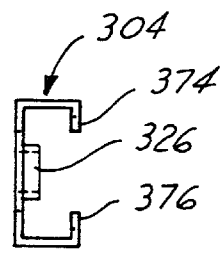
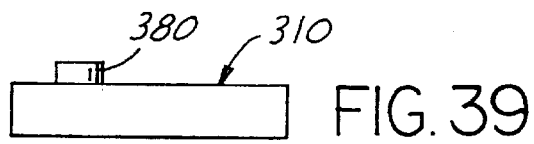
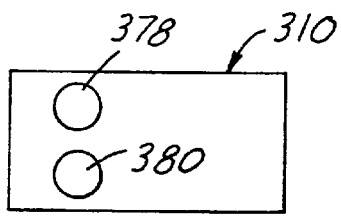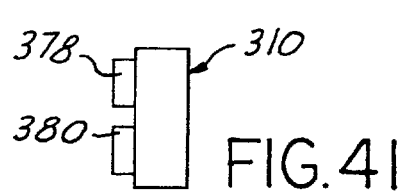
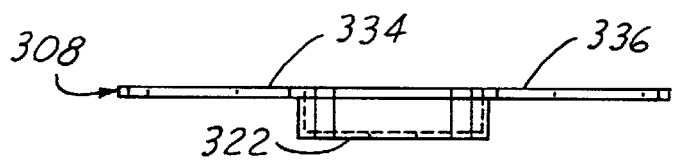
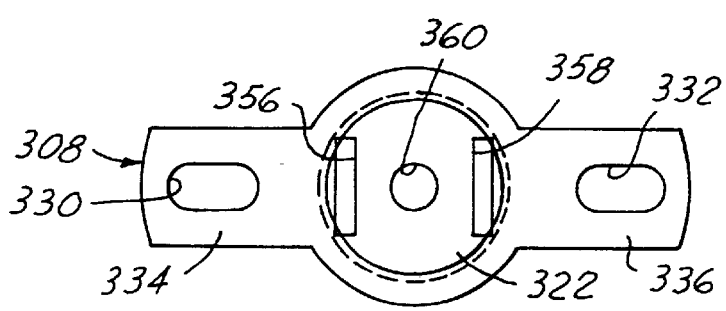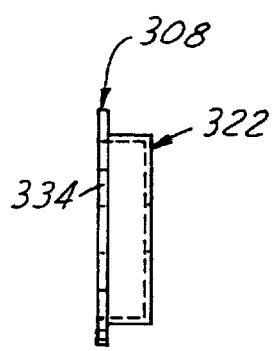

WALL ANCHOR

FIELD OF THE INVENTION

The present invention relates to a wall fastener anchor assembly for hollow walls, and more particularly to such a wall fastener utilizing thin sheet metal and/or plastic components and mountable to a thin hollow wall panel for holding articles and anchoring hardware of the type that subject the wall fastener and associated hollow wall panel to heavy loading.

BACKGROUND OF THE INVENTION

A number of fasteners have been used in the past for securing or suspending articles on hollow walls, such as, for example, dry walls or plasterboard walls. These walls are thin and produced out of powdery materials so that conventional fasteners, such as screws, nails, etc. are ineffective in supporting all but the lightest of articles hung on the wall. Through the years, the solution adopted to provide secure support for articles on such hollow walls has been the use of two part supports comprising a combination anchoring member and a conventional fastening member such as screw or bolt which is secured to the anchoring member, once such member has been inserted in and through the hollow wall. Typical such prior art fastening supports or anchors are described in the patent art, exemplified by U.S. Pat. Nos. 1,169,635, 1,181,336, 1694,493, 3,005,645, 3,170,361, 4,074,941, 4,500,238, 4,704,057, 4,997,327, 5,412,848 and 5,417,531, among others.

These various fastening members are inserted into the hollow wall usually by first drilling a hole through the wall sufficient to allow for insertion of the anchoring member in the hole. Once the anchoring member is in place, a screw or bolt is employed to either expand a portion of the anchoring member in the wall or to deform the anchoring member behind the wall so as to provide a back up plate-like arrangement to spread the weight of an article hung on the wall over a larger surface area. In both instances, the anchoring member becomes, for all practical purposes, a permanent part of the wall, as removal is difficult and results in damaging the wall.

Thus, while there are various types of wall anchor devices, the two types that are most common are a molly type anchor device and a toggle-type anchor device. A molly type anchor device generally consists of a body which is inserted through an opening formed in the drywall. The body threadably receives a screw, which when threaded into the body, causes the body to be compressed against the inner surface of the hole formed in the wall. The compression of the body results in deformation, wherein portions of the body spread out, pressing against the material defining the hole and possibly over the inner surface of the drywall. This prevents withdrawal of the body, and firmly anchors the device to the wall. Toggle type anchor devices consist of wings spread by a spring. The wings are forced together and inserted through an opening formed in the wall. Once through the wall, the wings are expanded or toggled apart by the spring. As the screw is threaded through the wing assembly, the wing assembly is pulled firmly against the inner surface of the wall. Most if not all commercially available toggle devices cannot be removed from the wall once installed, since there is no apparatus or practical procedure for closing the wing to allow withdrawal from the opening in the wall.

In the case of the aforementioned toggle type anchor devices, there is usually some kind of pivot nut intercoupling structure to enable the operating screw to move the toggle arms pivotally from a collapsed position to an expanded position. Generally the entire operating screw mounting load imposed on the fastening device or anchor is carried by this pivot structure. Thus, the strength of the toggle bolt is determined almost solely by the strength of the small inter-coupled elements rather than the overall structure of anchor itself. Also, since the weight of the load to be supported by the toggle anchor is applied to the toggle operating screw itself, the weight or load carrying capacity of the anchor is likewise limited by the strength of the toggle arm pivot structure, which is usually the weakest link in the anchoring system. In addition, if a present day type toggle operating screw or bolt is removed, the toggle arms that form the nut portion of the anchor will fall in the space behind the blind side of the wall. Therefore, a new toggle arm nut structure must be provided before the bolt or screw can be replaced.

A further and perhaps more serious limitation of both molly bolt type as well as toggle bolt type wall anchors is their relatively low maximum weight loading or applied loading capacity. For example, a serious problem exists in securely mounting heavy weight-bearing or force-loaded hardware on hollow wall constructions, such as grab bars that are mounted next to bathtubs or toilets to assist handicapped persons. The problem existing in field installation of such grab bars is to find adequate support to mount the bars that will sustain a load of about 200 to 300 lbs. Fasteners presently on the market do not meet this requirement.

Moreover, typically the load-bearing structure of the wall anchor structure is the single threaded operating bolt or screw that is utilized to pivot the arms or compress the molly bolt to form holding arms, the head end of this bolt or screw being utilized to support the load to be secured to the wall by the anchor. Thus, these wall anchors are by their nature "single-point" or "single-member" support structure systems with inherently limited load-bearing capability per anchor. Although theoretically a number of anchors could be used to increase the load-bearing capability for a given system, this is often not a practical solution.

Thus, even though there are numerous hollow wall fastening members and anchor structures and systems known and used commercially in the art, there remains a continuing and long felt need for an inexpensive wall anchoring structure and system that provides an economical and reliable support, easy insertion steps, removability with minimal damage to the hollow wall, can be readily manufactured at a low cost yet have a high strength-to-weight ratio and provides a high load-bearing capability for use in reliably mounting grab bars or like heavy-duty hardware on hollow walls, such as drywalls, composition sheet walls, plasterboard walls and molded fiberglass walls.

OBJECTS OF THE INVENTION

Accordingly, among the objects of the present invention are to provide improved wall mounting anchor or fastening system and structure and method of making and using the same that will overcome one or more of the aforementioned problems and disadvantages and/or that satisfies one or more of the aforementioned needs.

Another object is to provide an improved toggle bolt type mechanism that may be formed preferably of stainless steel sheet metal and/or plastic components by mass production progressive die stamping and bending operations to economically provide a high strength, corrosion resistant and economical wall anchor structure that is also economical from the standpoint of installation and use.

Another object is to provide an improved toggle bolt anchor assembly of the aforementioned character in which the toggle arm or blade provided as part of the toggle anchor assembly will not subsequently fall off when the toggle operating bolt or screw is removed so that such a bolt may be removed and subsequently replaced in the same toggle nut structure, and/or the entire assembly removed are re-used.

SUMMARY OF THE INVENTION

In general, and by way of summary description and not by way of limitation, the present invention accomplishes one or more of the foregoing as well as other objectives by providing an improved wall anchoring structure, system and method of manufacture and use of the same, wherein an improved fastening anchor assembly is provided for fastening an object to an interior side surface of a wall or other support member having an open area on an interior side surface of the wall opposite the exterior wall surface. The wall has a first mounting hole therethrough opening at each of these surfaces and of a first specified diameter for receipt therethrough of a portion of the anchor assembly. The anchor assembly includes a generally U-shaped mounting strap having a central bight portion and generally parallel first and second legs extending longitudinally from the bight portion and each terminating in a foot portion. In most embodiments each foot portion extends longitudinally generally perpendicularly from the associated leg portion in a direction away from the legs and thus these co-planar feet are adapted for engaging the- wall exterior surface.

The assembly also includes one or two elongated anchoring blades operably pivotally coupled to the strap legs for swinging motion between a wall-hole-installation collapsed position nested against the U-strap legs and a swung-out wall-mounting expanded position adapted for the blade(s) to clamp-engage the wall interior surface while the leg feet or an associated mounting flange clamp-engage the wall exterior surface. An operating threaded member, such as a screw/bolt, is preferably disposed between the strap legs and operably threadably drivingly engages the blade(s). In one embodiment the bolt has a distal end in reactive force abutment with the strap bight and a head end configured for imparting rotational torque to the bolt. In all embodiments, after the strap legs and bight have been inserted into the first wall hole to position the blade(s) in the open area adjacent the interior wall second surface, bolt rotation draws the blade(s) toward the strap feet or mounting flange for clamping the wall therebetween to thereby mount the anchoring assembly on the wall.

The grab bar or other hardware object to be anchored to the wall is fastened to the wall with separate load-carrying fastener member(s) that extend through one or both strap feet or mounting flange, then extend through secondary mounting hole(s) in the wall and threadably engage the blade(s) so that the operating screw bolt may be isolated from most if not all object-imposed forces, and so that heavy loads can be reliably carried on the hollow wall via the overall anchoring assembly structure. Thus substantially all of the weight loading of the hardware to be mounted by the anchor assembly may be carried by the hardware-engaged fasteners that are engaged with the strap feet, with the wall secondary openings and with the large-area anchoring blade(s). Therefore the externally-applied loading may be carried generally or mostly independently of the toggle operating bolt, although this bolt is also available for mounting objects to the wall, if desired.

Preferably the U-shaped mounting strap has a longitudinal dimension sufficient to maintain the operating screw/bolt positioned in recessed relationship between the strap legs with the head end of the bolt recessed below flush with the strap feet in all operative positions of the operating bolt when the anchor assembly is mounted on the wall with the wall surfaces clamped between the strap feet and anchoring blade(s). In some embodiments the U-shaped mounting strap comprises a sheet metal stainless steel strap of uniform thickness, and the blade(s) is also a stainless steel sheet metal member formed as a C-cross section channel having a center web bounded by two parallel flanges and oriented with the web facing the strap feet. In a preferred embodiment the U-strap is made of flexible plastic material.

In a first embodiment anchor assembly two anchoring blades are provided, and a pivot nut is disposed between the strap legs for pivotally hinging the blades together. The operating bolt is threadably engaged with the pivot nut to thereby provide the operable driving engagement with both blades. A hairpin spring is also carried by the pivot nut and has fingers in yieldable biasing engagement with the blades tending to swing them from their collapsed position to their swung-apart expanded position ready for clamping against the interior wall surface. The web portion of each of the blades has a fastener mounting hole adapted to coaxially register with a mounting hole in the associated strap leg foot for threaded engagement with an associated hardware mounting screw that extends through such foot mounting hole and an associated secondary wall mounting hole.

In second and third embodiments the anchor assembly has at least one of the strap legs necked down near the end thereof adjacent the bight to provide at least one stop-pivot shoulder therealong. Only one anchoring blade is utilized and it has a slot in a web portion receiving one of the-strap legs therethrough to pivotally and slidably mount the single blade on such strap leg. The blade web has a segment adapted to span between the strap legs with a small clearance when the blade is oriented with its web perpendicular to the legs. The web segment has a threaded mounting hole for threaded engagement with the operating bolt. Before screwing in the toggle-operating bolt, the blade is pivotable to a position with its web parallel to the strap legs after the blade has been slidably moved along the legs until the blade web slot registers with the shoulder portion of the strap, thereby enabling the blade to be pivoted fully down and nested against the strap legs for insertion through the wall mounting hole. The strap foot has at least one mounting hole provided therein, and the blade web is also provided with at least one mounting hole adapted to coaxially register with the strap foot mounting hole in their wall clamping positions for receiving an associated load-carry fastening member through the leg foot hole, through an associated secondary mounting hole in the wall, and then into the web hole. The third and fourth embodiments utilize two such fastening members, as in the first embodiment. The fourth embodiment utilizes a U-strap made of flexible material such as HDP.

BRIEF DESCRIPTION OF THE DRAWINGS

The foregoing as well as further objects, features and advantages of the present invention will become readily apparent to those skilled in the art from the following detailed description of preferred but exemplary embodiments of the present invention and the best mode presently known to the inventor of making and using the same, from the appended claims and from the accompanying drawings taken in conjunction therewith (which are to engineering scale unless otherwise noted), and in which:

FIG. 1 is a perspective and partially exploded view of a first exemplary embodiment of a wall fastening anchor assembly constructed in accordance with the invention along with its component parts shown by themselves but in a wall-installed orientation.

FIG. 2 is a fully exploded perspective view of the wall anchor assembly of FIG. 1.

FIG. 3 is side elevational view of the wall anchor assembly of FIGS. 1 and 2 shown with its toggle blades in collapsed position nested adjacent the legs of the anchor assembly strap as the anchor assembly is being installed through a wall opening, the wall being shown fragmentarily.

FIG. 4 is a top plan view of the anchor assembly and associated wall and wall opening positioned as shown in FIG. 3.

FIG. 5 is a view similar to FIG. 4 showing the anchor assembly further inserted into the wall opening and with the blades partially spring-biased apart and thus partially swung open toward their wall-mounted expanded positions.

FIG. 6 is a top plan view of the wall anchor assembly of FIGS. 1–5 in fully installed position in association with a hollow wall (shown fragmentarily), and with a mounting plate and associated grab bar shown fastened to the wall by such anchor assembly.

FIG. 14 is a partially exploded perspective view of an exemplary second embodiment of a wall fastening anchor assembly of the invention shown in wall-installed orientation but without the wall being shown.

FIG. 15 is a side elevational view of the second embodiment anchor assembly shown inserted completely through an associated wall mounting hole with the single toggle blade shown in collapsed position nested against the strap legs in the wall-insertion orientation thereof.

FIG. 16 is a side elevational view of the second embodiment wall anchor assembly shown fully installed in a wall with the mounting plate and rod of a grab bar shown fastened to the wall by such anchoring structure.

FIG. 17 is an elevational view of the single toggle channel arm blade of the second embodiment anchor assembly shown by itself.

FIGS. 18 and 19 are cross sectional views taken respectively on the lines 18—18 and 19—19 of FIG. 17.

FIGS. 20 and 21 are plan and side elevational views of the U-shaped strap of the second embodiment wall anchor assembly of FIGS. 14–16.

FIG. 22 is a fragmentary end elevational view of the U-shaped strap of FIGS. 20 and 21.

FIG. 32 is a top plan view of the fourth embodiment wall anchor assembly of FIGS. 31 and 31 shown with its toggle blade in collapsed position nested adjacent the collapsed legs of the plastic U-strap as the anchor assembly as it is being installed through a wall opening, the wall being shown fragmentarily.

FIG. 33 is a sequential view relative to FIG. 32 showing the fourth embodiment anchor after its channel blade has been fully inserted through the wall and being shown in phantom in a partially pivoted position and in solid lines as drawn back against the wall interior (blind side) surface by manipulating the U-strap of the assembly, and then inserting an operating bolt into the assembly to provide an initially wall-installed condition.

FIG. 34 is a view of the fourth embodiment assembly after the U-strap is pushed down into the anchoring flange and the toggle bolt tightened to securely clamp the blade against the interior wall surface and clamp the mounting flange against the exterior wall surface, and after which the two fastening members are inserted through the flange and plastic insert nuts-of the blade to provide the main load carrying hardware of the anchor.

FIG. 35 is a end view of the installation of FIG. 34 as viewed from the exterior side of the wall and without the two fastening members being shown.

FIGS. 36, 37 and 38 are respectively a top plan view, a front elevational view and an end elevational view of the channel-type single toggle blade of the fourth embodiment wall anchor assembly of FIGS. 30–35.

FIGS. 39, 40 and 41 are respectively a top plan view, a side elevational view and an end elevational view of one of the plastic insert nuts utilized in the channel blade of the fourth embodiment anchor assembly of FIGS. 30–38.

FIGS. 42, 43 and 44 are respectively a top plan view, a front elevational view and an end elevational view of the mounting flange member employed in the fourth embodiment wall anchor assembly of FIGS. 30–41.

DESCRIPTION OF PREFERRED EMBODIMENTS

FIRST EMBODIMENT

Figure 7:
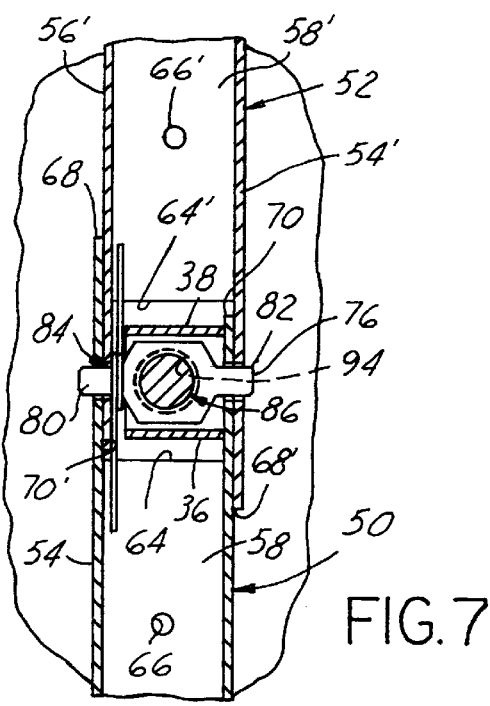
FIG. 7 is a fragmentary cross sectional view taken on the line 7—7 of FIG. 6.
Figure 8:
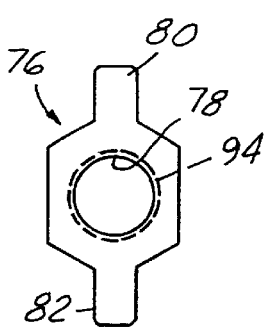
FIGS. 8 and 9 are elevational and side views respectively of the pivot nut employed in the wall fastening anchor assembly of FIGS. 1–7.
Figure 9:
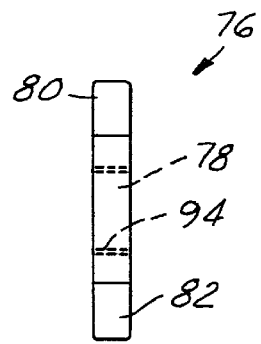

Referring in more detail to the accompanying drawings, FIGS. 1–13 illustrate an exemplary first embodiment wall mounting fastening anchor assembly 30 of the invention that employs a pair of spring biased toggle-type arm blades in the anchor assembly. As best seen in FIGS. 1 and 2, anchor assembly 30 further comprises a U-shaped mounting strap 32 having a central 180° curved bight portion 34 and generally parallel legs 36 and 38 integrally joined at one end to bight 34 and extending longitudinally therefrom and each terminating at their opposite longitudinal ends in an associated foot portion 40 and 42 respectively. Foot portions 40 and 42 extend longitudinally generally perpendicularly from the associated leg portions 36 and 38 and in a direction away from such legs. As best seen in FIG. 6, feet 40 and 42 are preferably coplanar and adapted to lay flat against an exterior exposed surface 44 of a drywall panel 46 or the like of a hollow wall construction of conventional type.

Figure 10:
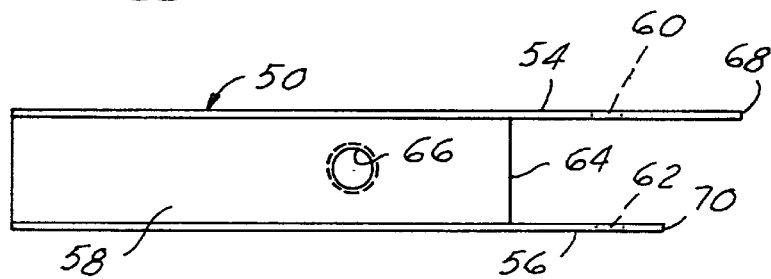
FIGS. 10 and 11 are side elevational and end views respectively of one of the two identical toggle channel arm blades of the assembly of FIGS. 1–8.
Figure 11:
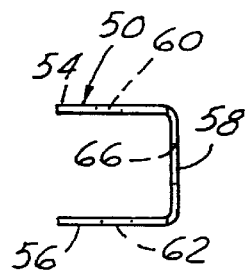
Figure 12:
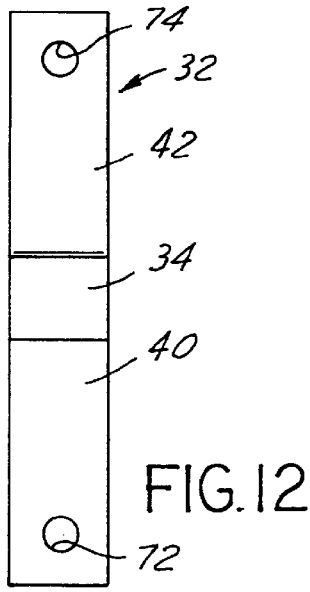
FIGS. 12 and 13 are end and side elevational views respectively of the U-shaped mounting strap of the wall fastening anchor assembly of FIGS. 1–7.
Figure 13:
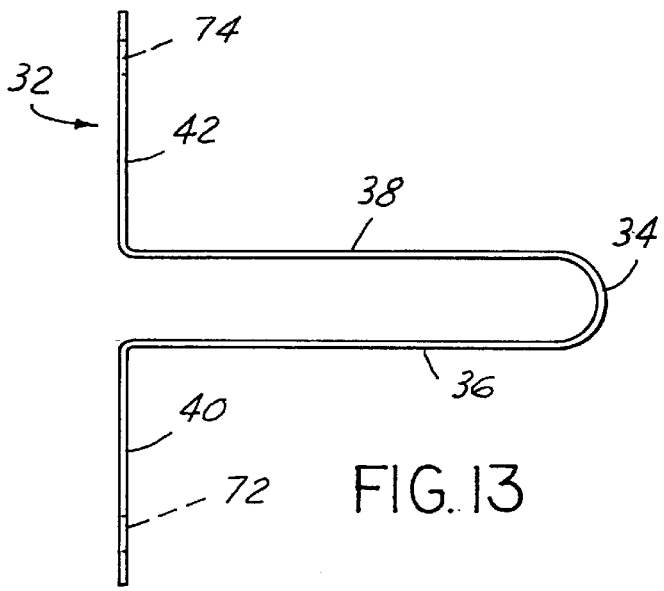

Anchor assembly 30 also includes a pair of identical right and left (as viewed in FIGS. 1 and 2) toggle arms in the form of sheet metal C-section channel blades 50 and 52 respectively. As best seen in FIGS. 2, 10 and 11, blade 50 is preferably made as a stamping from stainless steel sheet metal, for example, type 304 stainless steel of 19 gauge (0.042 inches) die cut. Blade 50 may thus be economically stamped and formed in a conventional progressive die forming operation to the configuration shown in FIGS. 10 and 11. Toggle blade 50 has upper and lower flanges 54 and 56 (as viewed in FIGS. 2, 10 and 11) integrally joined along their mutually adjacent longitudinal edges to a web 58 to provide a high strength-to-weight ratio and light weight toggle arm blade of C-channel construction. Coaxial trunion pivot holes 60 and 62 are respectively die-punched in flanges 54 and 56 adjacent the inner end of blade 50. A portion of flanges 54 and 56 protrude longitudinally beyond an end edge 64 of web 58 that is located as shown in FIGS. 2 and 10. A mounting screw hole 66 is provided in web 58 and located as shown in FIGS. 10 and 11, either by being die-punch -pre-formed or by through-wall drilling in-situ after anchor assembly initial installation. Preferably, upper flange 54 protrudes longitudinally beyond lower flange 56 at the inner or pivot end of blade 50, as best seen in FIGS. 2 and 10, these offset inner edges of flanges 54 and 56 being respectively designated 68 and 70 in FIGS. 2 and 10.

Toggle blade 52 is identical to blade 50 but is flipped over relative thereto in its assembled relationship in anchor 30. Accordingly, those elements of blade 52 corresponding to identical elements of blade 90 are given the same reference numeral raised by a prime suffix to facilitate their identification in this orientation and their description not repeated.

Preferably, a pre-punched hole 72 is provided in strap foot 40, and likewise a hole 74 in strap foot 42, and holes 72 and 74 are coaxially aligned with blade holes 66 and 66' respectively. in the wall-installed orientation of the components of anchor 30 when in their final wall-mounted condition as shown in FIGS. 1 and 6.

Anchor assembly 30 also includes a trunion pivot nut 76 having a threaded through opening 78 and a pair of diametrically opposite trunion studs 80 and 82, a hairpin spring 84 (shown in its free state condition in FIG. 2), and a toggle operating bolt 86. In final assembly of anchor 30, trunion nut 76 is captured between the flanges of blades 50 and 52. Thus, as best seen in FIGS. 1 and 7, nut stud 80 protrudes through flange holes 60 and 62' of flanges 54 and 56' respectively, and nut stud 82 protrudes through flange holes 62 and 60' of flanges 56 and 54' respectively. In such assembly, strap legs 36 and 38 capture nut 76 therebetween and in turn are captured in the opening or passageway or passageway formed between web inner edges 64 and 64' when blades 50 and 52 are thus pivotally coupled together by the nut studs. Hairpin spring 84 is assembled with its center multiple coils 88 encircling stud 80 between flange 56' and the nut body so that the divergent arms 90 and 92 of spring 84 are yieldably resiliently stressed in assembly to bear respectively against webs 58 and 58' of blades 50 and 52. Spring 84 thus tends to bias blades 50 and 52 in the direction of the arrows A and B in FIG. 5 and into their the wall abutting position shown in FIG. 6 (as well as in FIG. 1). In assembly the toggle blade operating bolt 86 is threaded through the internal threads 94 of pivot nut 76 and is thus received coaxially and centrally in anchor 30 with a loose clearance between strap legs 36 and 38.

In operation and use, anchor assembly 30 is secured to a hollow wall 46 by pre-drilling a suitable mounting hole 100 in the wall (FIGS. 3–6). The diameter of hole 100 is made slightly larger than the lengthwise dimension of nut 76 measured axially of and including studs 80 and 82 (FIG. 3) to permit their passage through hole 100 during installation of anchor 30 on wall 46.

To insert anchor 30 into wall hole 100, toggle blades 50 and 52 are first pivoted against the yieldable biasing resistance of spring 84 from their position shown in FIG. 1 to the installation-collapsed position nested against legs 36 and 38 as shown in FIGS. 3 and 4. Then anchor 30 is inserted blade-end-first into hole 100 from the exterior side surface 44 of wall 46. As indicated by comparing FIGS. 4 and 5, the spring-biased pivotal swing-apart motion of blades 50 and 52 relative to one another is limited by interference with the sides of hole 100. Thus, when anchor 30 reaches the insertion position of FIG. 5, arms 50 and 52 can only swing apart to the extent shown in FIG. 5. During further insertion motion of anchor 30 through hole 100 the trailing ends of the blades enter the hole and are forced back toward one another and so held until the blade trailing edges clear the interior wall surface 102 on the interior or blind side of wall 46. Then spring 84 is operable to swing blades 50 and 52 fully apart from one another in the direction of the arrows A and B of FIG. 5 into their coaxial or coplanar position shown in FIGS. 1 and 6.

Operating screw bolt 86 is then rotated in a direction to draw nut 76 and the pivotally intercoupled channel blades 50 and 52 outwardly or back against the inside surface 102 of wall 46. It will be noted that this screw-driven motion of blades 50 and 52 back toward wall surface 102 can be produced by maintaining a pull force on the bolt head while rotating the same. However, final anchor clamping force is not developed until the distal end 106 of bolt 86 is brought into abutment with the inside bearing surface of strap bight 34, i.e., the rotary end-abutment engagement position shown in FIG. 6. The clamping pressure exerted by travel of nut 76 along the threads of bolt 86 caused by such screw bolt rotation then forces blades 50 and 52 toward strap feet 40 and 42 until these strap feet are firmly clamped against exterior wall surface 44 as webs 58 and 58' of blades 50 and 52 are likewise firmly clamped against wall interior surface 102 (FIG. 6). Leg holes 72 and 74 are then respectively registered coaxially with pre-formed web holes 66 and 66', (or with the web location for such holes if drilled in-situ). Screw holes 108 and 110 then may be drilled through wall 46 from exterior wall surface 44 to interior wall surface 102 by using such leg holes 72 and 74 as a drill guide.

Next, the desired hardware to be mounted to wall 46 is brought into assembly position relative to the wall. This hardware, as illustrated by way of example in FIGS. 1, 2 and 6, may comprise a circular rimmed-disk mounting plate 120 provided with diametrically opposite screw holes 122 and 124 for receiving therethrough suitable self-tapping mounting screws 112 and 114 respectively. Plate 120 serves as a mounting support for a conventional hand grab bar 126 (FIG. 6) provided with two or more tubular support posts 128 that may be each welded at their opposite ends respectively to grab bar 126 and to a central chamfered opening 130 in associated plate 120. To install such grab bar hardware screws 112 and 114 (FIG. 6) are inserted sequentially through plate holes 122 and 124 respectively, through holes 72 and 74 of the feet 40 and 42 respectively, through wall holes 108 and 110 respectively and then rotated to tap threads into holes 66 and 66'. Thus, drawing screws 112 and 114 tight will draw mounting plate 120 against exterior wall surface 44 of wall 46 and further clamp anchor blades 50 and 52 against the interior surface 102.

With grab bar 126 so mounted to the wall by two or more of the anchors 30 so installed, it will be seen that the weight of grab bar 126, and more importantly, the heavy external forces applied to grab bar 126 in service, as when a person puts body weight on the same by hand gripping the bar, are transmitted as loading to wall 46 through mounting plate 120 to the mounting screws 112 and 114. These screws in turn are supported by (1) their threaded engagement with webs 58 and 58' of the anchor blades, (2) by their close fit engagement with and through strap foot holes 72 and 74 so as to also apply loading on strap feet 40 and 42, and (3) by their load bearing engagement with the wall material in wall holes 108 and 110.

On the other hand, it will be seen that very little if any of such weight and/or service force loading applied to grab bar 126 is reflected into operating bolt 86, regardless of the magnitude and direction of the external forces applied to grab bar 126. Also, even though a relatively large clearance may be provided, if desired, between strap legs 36 and 38 of anchor 30 and the surface of wall hole 100, this does not affect the load bearing capacity of anchor assembly 30. Likewise, working motion of the anchor assembly 30 under loading, if any, does not tend to produce working or wearing engagement of strap legs 36 and 38 on the gypsum or other wallboard material defining the surface of the formed wall opening 100, which otherwise could be an annoying source of plaster or drywall dust that eventually may emanate externally from behind the wall mount fixtures.

An alternative procedure for-mounting anchor assembly 30 on wall 46 is to omit the pre-punched holes 66 and 66' from blades 50 and 52 and instead to drill these holes when the drill bit is inserted through foot holes 72 and 74 and wall 46 after initially mounting anchor assembly 30 to wall 46. A suitable metal drilling bit is used in this alternative procedure for drilling through wall 46 as well as the webs 58 and 58' of blades 50 and 52. Then the self-tapping mounting screws 112 and 114 are installed as described previously. This alternative eliminates the need to insure coaxial registry of the pre-formed holes in strap feet 40 and 42 with any pre-formed holes in blades 50 and 52 during clamp mounting of anchor assembly 30 to wall 46.

It is to be noted that the two parallel legs 36 and 38 of U-strap 32 insure parallelism orientation of blades 50 and 52 with feet 40 and 42, and feet 40, 42 thus visibly indicate blade orientation and alignment even though the same is inaccessible and not visible from the exterior side of the wall.

It will be seen from the construction and installation of anchor assembly 30 as described above that load bearing capacity of the anchor assembly 30 itself is very high, the same having a high strength-to-weight ratio due to the C-channel cross section construction and high aspect ratio of the blades, the U-shaped configuration of the strap 32 and the orientation of these parts relative to one another in assembly and operation. Likewise, the load on the wall is carried by the two securely fastened mounting screws 112 and 114 which, in conjunction with mounting plate 120, spread the heavy loads widely over the wall and isolate them from operating screw bolt 86. Hence, anchor 30 provides a much greater load bearing capability than a molly bolt or single toggle bolt type mounting anchor wherein the operating bolt corresponding to screw 86 is not only used to spread the toggle arms but also is the primary or sole weight bearing attachment point for the external hardware to be carried by the anchor. The head of bolt 86 in the fully clamped condition of anchor assembly 30 also remains recessed below flush with the exterior surface 44 of wall 46, which is advantageous from the standpoint of hardware adaptability and appearance.

SECOND EMBODIMENT

FIGS. 14–21 illustrate a second embodiment of a fastening anchor assembly 130 also constructed in accordance with the present invention, and wherein components or elements identical to those of assembly 30 are given identical reference numerals and components or elements alike in function are given like reference numerals raised by a prime suffix and their description not repeated. Anchor assembly 130 is simplified in structure relative to anchor 30 in that it has only four components, namely (1) a U-shaped mounting strap 32', (2) a single pivotally mounted and bodily movable channel-type blade 52', (3) an operating screw bolt 86 and (4) a permanently affixed plate mounting screw 180, versus the six components of anchor 30, namely (1) mounting strap 32, (2) toggle blade 50, (3) toggle blade 52, (4) operating bolt 86, (5) trunion pivot nut 76 and (6) biasing hairpin spring 84.

Mounting strap 32' differs from strap 30 in that the legs 36' and 38' terminate short of the distal end 34' of strap 32' at a pair of beat-in stop shoulders 132 and 134, respectively. These shoulders project toward one another and are respectively joined integrally to short strap leg extensions 136 and 138 that extend parallel to one another and to legs 36' and 38', but are more closely spaced than strap legs 36' and 38', and that terminate in the central bight portion 34'. In addition, as best seen in FIG. 16, the center of bight 34 is provided with a struck-out nose 140, the interior concave surface of which provides a homing bearing seat for the rotary abutment thereagainst of the distal end 106 of operating bolt 86.

The single toggle blade 52' of anchor 130 is shown in detail in FIGS. 17, 18 and 19 and again is preferably a die-stamped and formed high aspect ratio stainless steel sheet metal member of the same gauge as blades 50 and 52, and likewise has a U-shaped channel cross section as defined by a web 142 joined at its side edges to parallel flanges 144 and 146. Web 142 is cut short at one end to define an inset transverse edge 150 adjacent its strap-mounting end. A narrow transverse slot 152 is also provided in web 142 to provide parallel slot guide edges 154 and 156 (FIG. 17). A nut opening 157 is provided in web 142 centrally between edges 150 and 154 and flanges 144 and 146. Nut opening 157 is punch extruded to have a neck portion 158 extending inwardly between flanges 144 and 146, as best seen in FIGS. 18 and 19. Preferably, the nut hole 157 is provided with internal threads 160 for mating with the threads 162 of bolt 86. A mounting screw hole 168 is also provided in web 142 and as also punch extruded inwardly to provide a neck 170 in turn provided with threads 172 for threadably receiving mounting screw 112 upon installation of anchor 130 in wall 46 (FIGS. 14 and 16).

In the initial assembly of the components of anchor assembly 130, blade 52' is installed on strap 32' by inserting foot 42 between flanges 144 and 146 and thence through slot 152 in web 142. The slotted end of blade 52' then is drawn along foot 42 toward leg 38', and then blade 52' is drawn outwardly along leg 32', as shown in FIG. 14. Note that blade 52' has the capability of only a limited range of pivoting on strap 32' (approximately 40–45° down from vertical or perpendicular with strap legs 38', 36') due to the limited swing clearance in slot 152 relative to leg 38' between a partially folded position laid at about a 40–45° incline from leg 38' with web 144 (not shown), to a position perpendicular thereto as shown in FIG. 14. However, as shown in FIG. 15, blade 32' may be drawn further along legs 38' and 36' toward the strap bight end until slot 152 registers with leg shoulder 132. Note that during this outward movement of blade 52' along strap leg 38', and when blade 52' is pivoted to be perpendicular to legs 36' and 38' (FIGS. 14 and 16), blade 52' is thereby oriented such that web edge 150 is spaced closely adjacent to inner surface of leg 36'. Likewise, web slot edge 154 is then spaced closely adjacent to inner surface of leg 38'. Hence, the threaded nut neck 158 is maintained centered between legs 36 and 38' (with very little clearance motion permitted between blade 52' and strap legs 36', 38') when blade 52' is oriented transverse to these legs, i.e., its orientation in FIGS. 14 and 16.

When blade 52' reaches the aforementioned position on leg 38' where slot 152 registers with shoulder 132, blade 32' then can be pivoted down so that its longitudinal axis is parallel to that of legs 36' and 38', as shown in FIG. 15. The reason for this is the narrow width of slot 152, i.e., there no longer is interference between slot edge 154 and the inner surface of leg 38' that prevents blade 32' from pivoting more than say 40° toward parallel.

The installation of anchor assembly 130 in wall 46 is illustrated in the sequence of FIGS. 15 and 16. To install anchor 130 through mounting opening 100 in wall 46, blade 52' is first drawn out and pivoted down to a folded or collapsed condition on short strap legs 136, 138, as shown in FIG. 15, with its web 142 laying flat against short leg 138 and the nut portion of web 142 (between slot 154 and edge 150) abutting upwardly against the inner surface of leg 38'. It will be noted that, with anchor 130 assembly so conditioned and when strap 32' is oriented with foot 42 upright, as shown in FIG. 15, the center of gravity of blade 52' is to the right of the pivot point of blade 52' on strap 32', the pivot point being where shoulder 132 protrudes through slot 152. Hence, blade 32' will be gravitationally biased to pivot to and hold the position shown in FIG. 15 once so oriented. Thus, the installer need only hold onto the feet 42 and 44 and maintain this orientation to thereby keep blade 52' folded down as strap 32' is inserted from wall exterior surface 44 through wall hole 100 to bring it completely within and past flush with the wall interior surface 102.

Then, using feet 40 and 42 for finger grips, the entire anchor assembly 130 may then be manually rotated 1800. This causes blade 52' to fall to a position perpendicular to strap legs 36' and 38', and with web edge 150 positioned inwardly of but adjacent shoulder 132'. While anchor assembly 130 is maintained manually so oriented, operating bolt 186 can be inserted between legs 36', 38' from the exterior side of wall 46 and threaded a short distance into the threads of the nut neck 158 to ensure threaded engagement between the bolt and blade. Then strap feet 42 and 44 may be gripped and rotated at 180° again to bring blade 52' to the upright position shown in FIGS. 14 and 16. Screw/bolt 86 is then screwed further through the neck 158 until its distal end 106 abuts the interior surface of strap bearing pocket 140, as shown in FIG. 16. Further rotation of bolt 86 causes travel of nut 158 toward wall surface 102 and hence draws blade 52' toward feet 42, 44, until blade 52' abuts wall surface 102, as shown in FIG. 16. Bolt 86 is then tightened to cause a tight clamping engagement of blade 52' against surface 102 and cause feet 42 and 44 to tightly clamp wall exterior surface 44 to thereby securely mount anchor 130 on the wall.

Preferably, in the example illustrated where the grab bar hardware includes the mounting plate disk 120, foot 140 may be provided with a screw stud 180 having a head 182 welded to the inner surface of foot 40 and having a shank protruding outwardly so as to extend through mounting hole 124 in plate 120 for reception of a conventional acorn nut 184, as shown in FIGS. 14 and 16.

To mount the grab bar hardware, mounting screw 112 is inserted through plate hole 122, foot hole 74 and through the hole 108 drilled in the wall 95 and then threaded at its end into the threads of nut neck 170 in web 142 (FIGS. 14 and 15). This draws plate 120 against wall surface 44 by screw thread reaction with nut 170 in blade 52' and blade abutment with the interior wall surface 102. Stud 180 will concurrently register and protrude outwardly through hole 124 in mounting plate 120 for threaded reception of acorn nut 184 on its end protruding from plate 120.

It is to be understood that the nut end of mounting screw 112 can likewise be in the form of an acorn nut head if desired to aesthetically match acorn nut 184. It will also be understood that stop shoulder 132 may be omitted, but preferably is provided in the event it is desired to reversibly mount blade 52' on strap 32' during assembly of the components of anchor assembly 130.

It thus will be seen that with anchor assembly 130 so installed in wall opening 100 on wall 46, a secure and heavy weight-load bearing mount for grab bar 126 is also provided by this second embodiment anchor fastening assembly. It is also to be understood that the installed relationship of blade 52' may be downward instead of upward, as shown in FIG. 16, horizontal or at any other angular orientation. However, the vertical and uppermost mounting orientation of blade 52' is preferred in those instances where the maximum loading on the grab bar by external forces is to be directed generally downwardly. Again, it will be seen that blade orientation is governed, and indicated exteriorly, by the U-strap orientation.

In accordance with another feature of the second embodiment 130, the same is removable without loss of any parts behind the wall. Thus, if the mounting screw 122 is removed and acorn nut 184 unscrewed from stud 180, plate 120 and associated grab bar then can be removed from the wall. Then bolt 86 is unscrewed completely from blade 52' and removed out through wall opening 100. Next, by manipulating feet 40 and 42 to rotate them 180° from the position shown in FIG. 16, blade 52 can be brought to an orientation where it is now hanging downwardly from strap 32'. Then if strap 32' is pulled outwardly, blade 52' will be brought back to abutment with shoulder 132. As feet 40, 42 are again rotated 180°, gravity will drop blade 52' down to the position of FIG. 15 where it is again folded and nested against the strap. When in this condition, the subassembly of blade 32' and strap 52' can be easily withdrawn through wall opening 100 in the reverse sequence of its insertion sequence, thereby removing the anchor assembly completely from wall 46 without loss of any parts behind the wall.

THIRD EMBODIMENT

FIGS. 23–29 illustrate a third embodiment fastening anchor assembly 200 also constructed in accordance with the present invention, and wherein components or elements identical to those of assemblies 30 and/or 130 again are given identical reference numerals and components alike in function are given like reference numerals raised by prime suffix and their description not repeated.

The third embodiment wall anchor 200 has, as features in common with the first and second embodiment wall anchors 30 and 130, a U-shaped mounting strap 202 substantially identical to strap 32' of the second embodiment, and a relatively long operating screw bolt 204 similar to operating bolt 86 of the first and second embodiments. Likewise, the method of installing the third embodiment anchor 200 is very similar to that described in conjunction with the installation of the second embodiment anchor and referencing FIGS. 14, 15 and 16 previously hereinabove.

Figure 23:
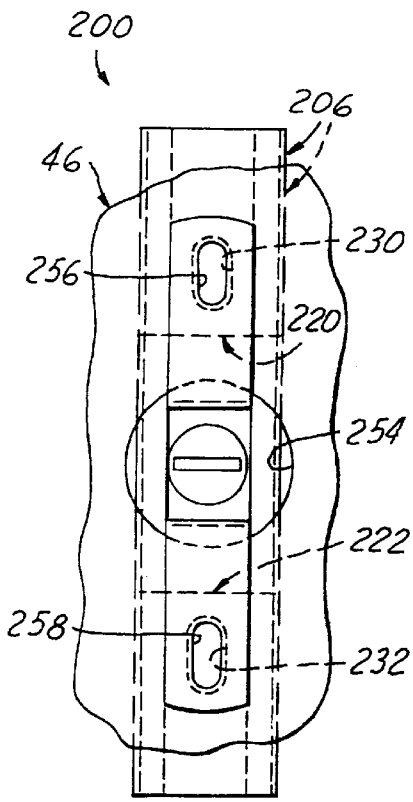
FIGS. 23 and 24 are respectively an end elevational view and a top plan view of an third embodiment of a wall fastening anchor assembly of the invention shown in wall installed orientation, with the wall shown in fragmentary cross section in FIG. 24.
Figure 24:
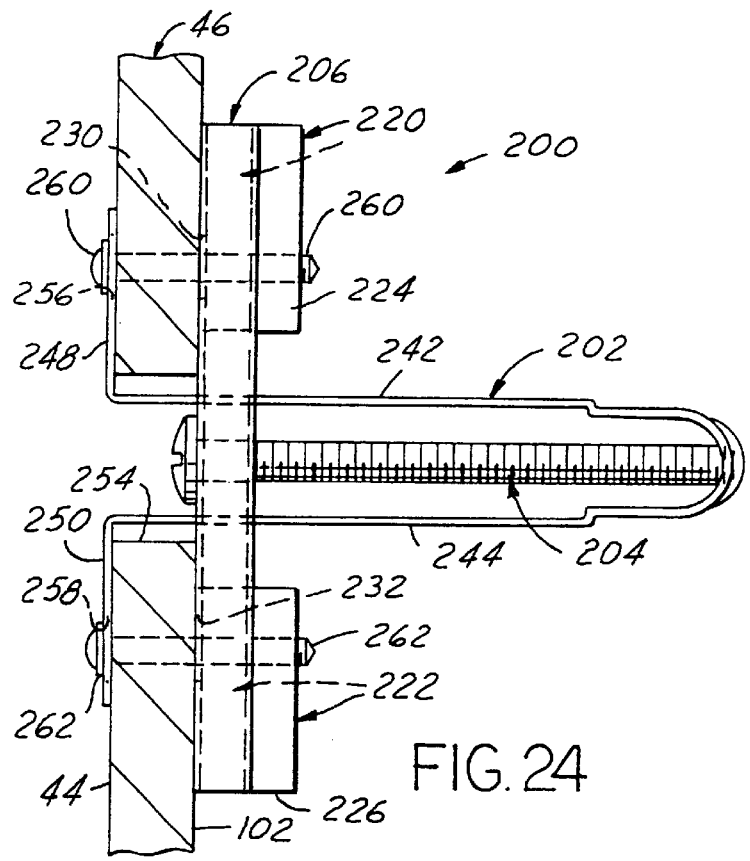
Figure 25:
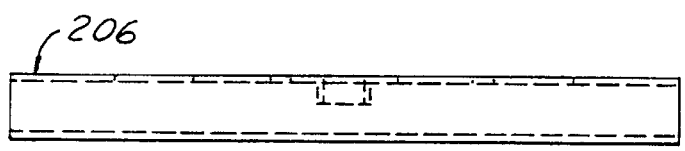
FIGS. 25, 26 and 27 are respectively a top plan view, a side elevational view and an end elevational view of a single toggle arm channel-section blade utilized in the third embodiment wall anchor assembly of FIGS. 23 and 24.
Figure 26:
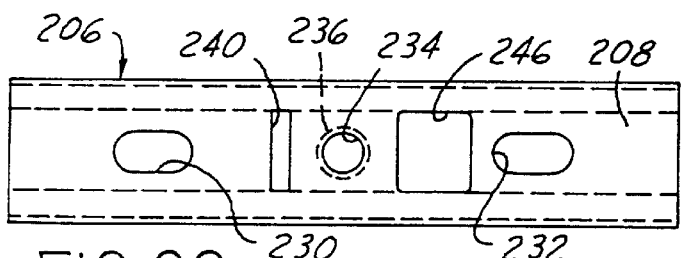
Figure 27:
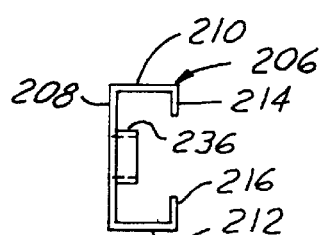
Figure 28:
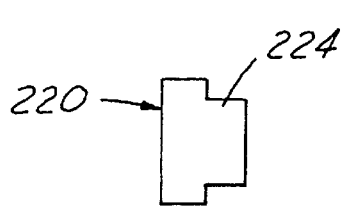
FIGS. 28 and 29 are respectively an end elevational view and a side elevational view of one of the two plastic insert nuts provided one at each of the opposite ends in the third embodiment blade of FIGS. 23–27.
Figure 29:
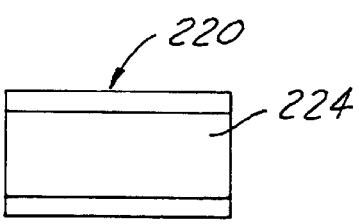

Wall anchor 200 differs from anchor 130 primarily in the construction of the channel-type blade 206 shown in assembly in FIGS. 23 and 24 and by itself in FIGS. 25, 26 and 27, versus the blade 52' of the second embodiment wall anchor 130. Channel blade 206 is C-shaped in cross section as defined by a web 208 joined at its longitudinal side edges to parallel flanges 210 and 212 that terminate in edge lips 214 and 216 respectively that in turn extend toward one another. Channel lips 214 and 216 capture in initial assembly a pair of plastic inserts 220 and 222 that are slidably inserted one into each of the opposite longitudinal ends of channel blade 206 so as to be positioned in assembly as shown in FIGS. 23 and 24. As best seen in FIG. 28, each of the inserts 220, 222 is shaped as a block-T in cross section, so as to have a large laterally protruding and longitudinally extending lug 224, 226 respectively that is dimensioned to fit closely between the facing edges of blade lips 214 and 216 and to protrude outwardly of blade 206, as best seen in FIG. 24. Blade 206 is provided with a pair of oblong fastener openings 230 and 232 (FIGS. 23 and 26) that register in assembly with inserts 220 and 222 respectively (FIGS. 23 and 24). Blade 206 also has a centrally located nut opening 234 that is punch extruded to have a neck portion 236 (FIG. 27) extending inwardly between flanges 210 and 212. Preferably nut hole 234 is provided with internal threads for mating with the threads of bolt 204, as best seen in FIG. 24.

Blade 206 is also provided with a narrow transverse slot 240 corresponding to slot 152 of blade 52' and receiving with a relatively close sliding fit leg 242 of strap 202. The other leg 244 of strap 202 extends through a larger, square shaped opening 246 (FIG. 26) in blade web 208 that is located on the side of center hole 234 opposite to slot 240. It is to be understood that blade 206 is assembled onto strap 202 while feet 248 and 250 are oriented parallel, i.e., prior to their being bent so as to extend away from one another and to be coplanar with one another as shown in FIG. 24. Feet 248 and 250 thus when bent to final form capture blade 206 in assembly on strap 202.

It is also to be understood that the width of the large web opening 246 extends longitudinally of the blade a distance sufficient to enable the blade to be pivoted from the final assembly orientation of FIG. 24, wherein its longitudinal axis extends perpendicular to that of strap 202, to a generally parallel relationship with the blade laid flat against the strap corresponding to the relationship of blade 52' with strap 32' of the second embodiment in the installation orientation shown in FIG. 15. Also, due to the greater width of web 208 of blade 206 as compared to that of blade 52', a larger diameter through-hole 254 is required to be bored through the drywall 46 as compared to the diameter of hole 100.

After blade 206 has been collapsed and inserted through wall opening 254 and then pivoted back to the installation position shown in FIG. 24, and then tightened against the inner surface 102 of panel 46 by rotating operating bolt 204 in the manner of the second embodiment, it will be been that U-strap 202 causes blade 206 to be properly aligned with its longitudinal axis parallel to that of feet 248, 250. Likewise, due to U-strap 202, blade web openings 230 and 232 will be aligned with similar oblong openings 256 and 258 in feet 248 and 250 respectively. Pilot openings then may be drilled from the exterior side of wall panel 46 by registering the suitable drill bit through opening 256 and the associated opening 230 in blade 206 and into the associated plastic insert block 220. Then preferably a self-tapping type wood or sheet metal screw is inserted from the exterior side 102, through opening 256, through the drilled passage in panel 46 and thence into the pilot passage in block 220. Screw 260 then cuts threads in the plastic material block 220 to provide a secure and firm anchorage therein and to enable the screw to be drawn tight. Likewise, a like screw fastener 262 is installed through openings 258, panel 46 and into associated plastic insert block 222. These fasteners 260 and 262 may then be backed off and removed, and then inserted through a suitable mounting plate such as plate 120 in FIGS. 1 and 2 in the first embodiment, i.e., fasteners 256 and 258 being substituted for fasteners 112 and 114 in the first embodiment. The fasteners are then re-threaded back into operative holding position in the wall anchor assembly to clamp the mounting plate 120 against the exterior surface 44 of wall panel 46 in covering relation to feet 248 and 250.

The third embodiment wall anchor 200 is thus advantageous over second embodiment anchor 130 in providing a balanced retaining structure, i.e., the operating screw bolt or machine bolt 204 threads through a centrally located threaded neck extrusion 236 instead of through such an extrusion 158 that is located longitudinally off-center of the channel blade. Hence, the wall engaging surface of the channel blade 206 extends equal distances on either side of bolt 204, rather than being asymmetrically unbalanced as shown in FIG. 16 of the second embodiment 130. Better balance and even distribution of clamping forces is thus provided by the third embodiment anchor 200 in this regard.

Another advantage of the third embodiment anchor 200 over the second embodiment anchor 130 is that both of the fasteners employed to mount the mounting plate 120 now each extend completely through the panel blade and in addition, through the plastic insert blocks 220 and 222. The loads imposed on both the strap 202, blade 206 and feet 248 and 250 are thus balanced and uniformly distributed, and the mounting stress is shared equally between the two mounting fasteners, thereby enabling anchor 200 to provide substantially greater load-bearing capacity than anchor 130. In addition, plastic inserts 220 and 222 captured adjacent each end of the channel blade 206 provide a very good engagement and load-bearing material for the self-threading screws 256 and 258, as well as more reliable fastening engagement for the screw threads of these fasteners as compared to the internal threads pre-provided in the offset extruded neck 170 of blade 52' of the second embodiment 130, and also as compared to the short length of the threads in the fastener holes 66 and 66' of the channel blade 50 of the first embodiment wall anchor 30. Thus, it will be seen that the third embodiment wall anchor 200 provides advantages over the second embodiment wall anchor 130 while retaining the advantages of the second embodiment wall anchor 130 relative to the first embodiment wall anchor 30 described previously. Hence, wall anchor 200 is the preferred embodiment of these three wall anchor embodiments described thus far.

FOURTH EMBODIMENT

FIGS. 30–44 illustrate a fourth embodiment of a fastening anchor assembly 300 also constructed in accordance with the present invention, and wherein components or elements identical to those of wall anchor assemblies 30, 130 and 200 are given identical reference numerals, and components or elements alike in function are given like reference numerals raised by a prime suffix and their description not repeated.

Figure 30:
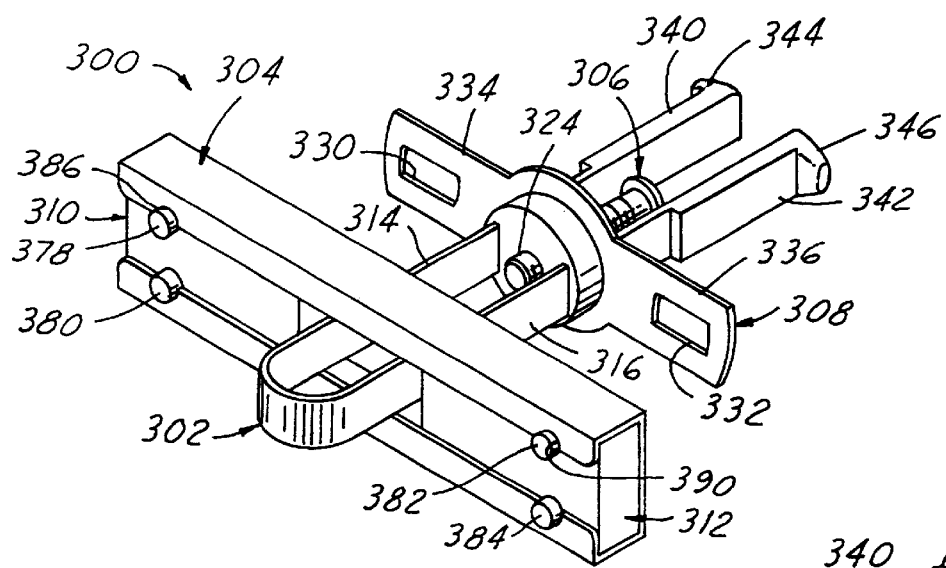
FIG. 30 is a perspective and partially exploded view of a fourth exemplary embodiment of a wall fastener anchor assembly constructed in accordance with the invention and shown in a wall-installed orientation but apart from the wall.
Figure 31:
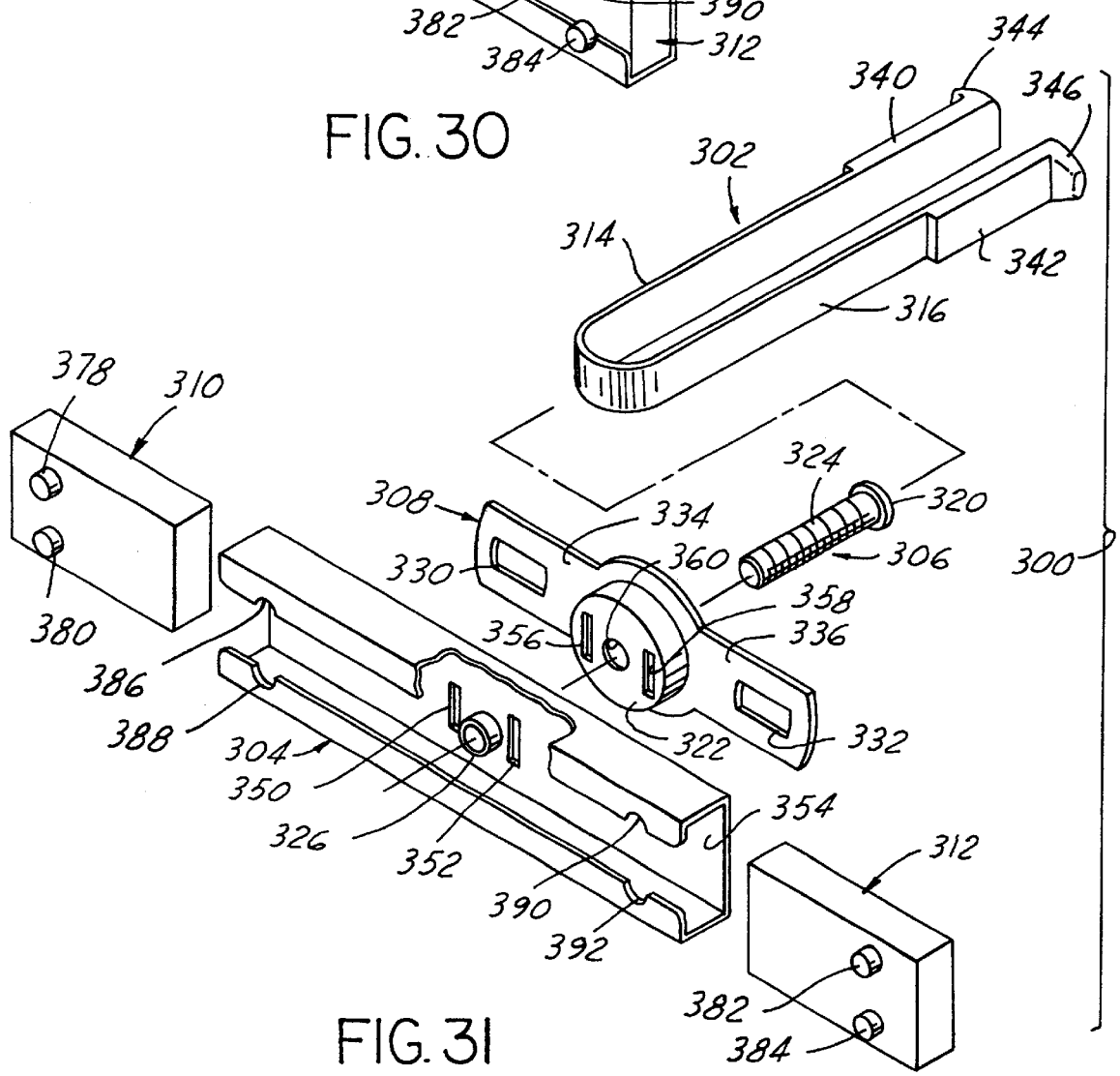
FIG. 31 is an exploded-perspective view of the wall anchor assembly of FIG. 30.

Referring to FIGS. 30 and 31, anchor assembly 300 comprises a U-shaped mounting strap 302, a single, pivotally mounted and bodily movable channel-type blade 304, an operating screw bolt 306, an exterior mounting flange 308 and a pair of plastic insert nuts 310 and 312. The fourth embodiment wall anchor 300 thus differs as to certain features from the first three wall anchor embodiments. The first such difference is that the U-shaped mounting strap 302 is made of inexpensive plastic material, such as high density polyethylene (HDP), so as to be much more flexible than the stainless steel sheet metal U-straps of the first three embodiments, particularly in the plane of the strap defined by its two parallel legs 314 and 316 (i.e., in the plane of the drawing in FIGS. 32 and 33). In the species of the fourth embodiment illustrated in FIGS. 30–43, strap 302 functions only to facilitate assembly of the wall anchor and to hold the components together as an unmounted hardware fixture and to facilitate installation and proper orientation of the wall anchor channel plate 304 on the blind side 102 of wall panel 46, as in the first three embodiments, but not as a load-bearing element subsequent to final installation on the wall panel.

Another feature distinguishing the fourth embodiment from the first three embodiments is that the wall mounting load on the wall anchor components is applied to the opposite surfaces 44 and 102 of wall panel 46 by the operating bolt 36 being placed in tension (instead of in compression) between the channel blade 304 and mounting flange 308 of the anchor assembly 300. Head 320 of bolt 306 bears on the exterior side of the circular center well panel 322 of the mounting flange 308 to thereby clamp it against the exterior surface 44 of wall panel 46, while the threads of the mounting bolt shank 324 engage the threaded neck 326 of the stainless steel channel blade 304 to draw it up against the interior surface 112 of wall panel 46 during the installation procedure.

However, like one principal feature of the first, second and third embodiments, the load of the object (such as grab bar 126) to be wall mounted by wall anchor 300 is still primarily carried by the through-wall fasteners 260 and 262 that are inserted through oblong fastener slots 330 and 332 provided in the oppositely extending arms 334 and 336 of mounting flange 308 (FIGS. 30 and 31). As in the third embodiment, fasteners 260 and 262 may be inserted through pilot holes drilled in the wall panel (after mounting the anchor) and through each of the associated plastic inserts 310 and 312 that are received in the interior of the C-channel section of blade 304 as shown in FIGS. 30 and 31). Again, preferably self-threading wood or sheet metal screws are employed for this purpose. However, alternatively self-drilling hardened-type wood screws that are capable of penetrating the wall panel and the plastic inserts without predrilled holes may be used. Fasteners 260 and 262 in the fourth embodiment likewise are employed in the manner of fasteners 112 and 114 of the first embodiment 30 to support a mounting plate 120 or other equivalent exterior mounting fixture of the object to be wall mounted. The load so mounted is thus applied directly by fasteners 260 and 262 to the interior mounted channel blade 304 and spread evenly over a wide surface area of the interior surface 102 of wall panel 46 to thereby greatly increase load-bearing capacity of the wall anchor 300.

Flexible U-strap 302 of anchor 300 is provided at the free ends of each of its legs 314 and 316 with a thickened section 340 and 342 respectively each terminating in a short foot section 344 and 346 respectively. The flexible U-strap 302 is assembled to channel plate 304, by individually inserting the strap feet 344, 346 foot-first through an associated one of a pair of receiving and retaining slots 350 and 352 provided in the web 354 of channel plate 304, one on either side of the threaded neck 326. Then the feet are inserted through another pair of associated receiving and retaining slots 356 and 358 provided in the panel 322 of the center well of mounting flange 308, one on either side of the center hole 360 that receives the shank 320 of the operating bolt 306 in assembly.

It is to be understood that the flexibility of the legs 314 and 316 of U-strap 302 enables the thickened portions 340 and 342 to be sufficiently canted to facilitate insertion of the associated foot 344, 346 through these slots during initial assembly of the components of wall anchor subassembly 300. Once the U-strap 302 is so threaded through the components 304 and 308, the thickened portions 340 and 342 tend to be maintained in parallelism so that the feet 344 and 346 act as stops against the exterior surface of the center panel 322 of the mounting flange 308, as best seen in FIGS. 32, 34 and 35. The strap free end feet 344 and 346 are thus accessible at the exterior surface 44 of mounting wall panel 36, and can be made more accessible so as to protrude outside of the well of the mounting flange 308 by sliding the mounting flange along the thickened portion 340 during the installation procedure steps illustrated in FIGS. 32 and 33.

As illustrated and best seen in FIG. 32, because U-strap 302 is highly flexible, there is no problem in orienting the channel blade 304 with its longitudinal axis parallel to the longitudinal axis of U-strap 302 as well as to the axis of the anchor hole 254 drilled in wall panel 46 to thereby facilitate anchor through-wall insertion. As will be seen from the sequence of FIGS. 32, 33 and 34 of the installation steps for anchor 300, after the channel blade 304 has been inserted through the wall hole 254, blade 304 can be manipulated by manipulating the U-strap legs 314 and 316 longitudinally relative to one another to thereby orient blade 304 parallel to the interior wall surface 102, or sufficiently inclined thereto, so that when the free ends of U-strap 302 are pulled back the U-strap will pull the anchor blade 304 back flat against the wall interior surface 102. Anchor bolt 306 can then be inserted through the hole 360 in center panel 322 in the mounting flange and its shank 324 threadably engaged in the threaded neck 326 of anchor channel blade 304, as shown in FIG. 33. Rotation of operating bolt 306 then draws the mounting flange 308 and channel blade 304 tight against the opposite associated wall surfaces 44 and 102 as shown in FIG. 34.

It is to be noted in the installed condition of anchor 300 shown in FIGS. 34 and 35 the offset circular well at the center of mounting flange 308 seats recessed into the through-wall hole 254 so that co-planar arms 334 and 336 of mounting flange 308 can lay flush against the exterior surface 44 of wall panel 46. Likewise, head 320 of operating screw or bolt 306 in the fully installed condition is recessed within this well of the flange 308, as shown in FIG. 34. Then, as with the previous embodiments, pilot holes can be drilled through the wall by inserting drill bits through the slots 330 and 332 of the mounting flange 308 which, due to U-strap orientation, in turn register with the plastic insert nuts 310 and 312 inserted into the hollow section of blade 304, as shown in the sequence of FIGS. 31 and 30. The back web 354 of blade 304 is provided with the oblong fastener openings 370 and 372 (FIG. 37) that thus become aligned with slots 330 and 332 by the action of U-strap 302 orienting blade 304 with its longitudinal central axis parallel to that of the arms 334, 336, and generally co-planar to such arms of mounting flange 308 and legs 314 and 316 of strap 302.

It thus will be seen that the fourth embodiment wall anchor 300 is designed to primarily support the load object, such as grab bar 126 (FIG. 6), on wall 46 by the two through-wall fasteners 260 and 262 that threadably engage the plastic nuts 310 and 312 carried in the anchor blade 304. However, the anchor-mounting stress on flange 308 and blade 304 is not applied to any portion of the U-strap 302 but rather is applied directly from head 320 of -bolt 306 seating in the well of flange 308. Thus, it will be seen that the anchor channel blade 304 is pulled against the interior wall surface 102 by its direct threaded engagement with anchor bolt 306 rather than being pushed against the wall by the threaded engagement of the anchor bolt of the U-strap, as in the first, second and third embodiments 30, 130 and 200.

It will also be noted that channel blade 304, like blade 206, is of C-shape in cross section and thus has the retaining lips 374 and 376 for capturing the slidably inserted plastic nuts 310 and 312. In addition, each of these nuts is provided with a pair of bosses 378, 380, and 382 and 384 (FIGS. 30, 31 and 39–41) which are designed to have a slight spreading action on the lips 374 and 376 as the nuts 310 and 312 are slid endwise into the confines of the channel blade until these bosses register with associated retaining half notches 386, 388, and 390 and 392, as shown in FIG. 30. Registration of the bosses 378–384 with the notches 386–392 thus yieldably locks the nuts 310 and 312 longitudinally in place in the channel blade 304 as a pre-assembly condition.

From the foregoing description, it will now be apparent to those skilled in the art that the fastening anchor assembly embodiments 30, 130, 200 and 300 of the invention amply fulfill the aforementioned objects and provide many further advantages and features over the prior wall mounting anchor devices. The wall mounting fastening anchor assemblies 30, 130, 200 and 300 may be readily mass produced primarily with stamped, die-cut and die-bent sheet metal components, (and with an injection molded strap 302 and inserts 310 and 312 in the case of anchor 300) and thereby provide a high strength, light weight, corrosion-resistant and economical anchor assembly. These improved anchor structures have a very high load bearing capability for hollow wall mounting due both to the structural strength of the anchor components themselves as well as to the greatly increased load bearing spread of the blade or blades against interior wall surface 102, and that of feet 40, 42 or arms 334, 336 bearing on. the exterior wall surface 44. Thus, the anchor assemblies of the invention enable the mounting of grab bars and the like on hollow wall constructions that will adequately support and sustain a load on the order of up to about 300 lbs. on a typical ⅝ thick plasterboard drywall, a load bearing capability not presently available from hollow wall anchoring fasteners presently on the market.

In all embodiments the load bearing capability is provided entirely or at least primarily by a wall mounting screw or screws that are independent of the toggle operating bolt. This in turn means that the toggle operating bolt is not required to support the exterior loading. Hence, there is less likelihood of loosening the clamping force exerted by the toggle operating bolt due to typical severe cyclical loadings being applied to the grab bar or similar structure supported by the wall mounted anchor.

Moreover, the second embodiment 130 requires only three or four components, is very simple in construction, economical to fabricate and, in addition, has the feature of removability without loss of any components from the exterior surface of the wall.

From the foregoing it will also be seen that one generic novel feature of wall anchors 30, 130, 200 and 300 is that of providing a U-strap having its parallel legs strung through spaced apart slots in the interior channel blade of the wall anchor assembly. The U-strap is thus capable of supporting the channel blade loosely and pivotally during insertion of the strap and channel together through the drilled wall opening. The U-strap is then used for pulling the channel blades back against the blind side of the wall.

Another common point of novelty in all four embodiments 30, 130, 200 and 300 is the provision of the two spaced apart and parallel legs of the U-strap that, by engaging the channel blade via two spaced apart openings or passageways therein, render the U-strap capable of serving as an exteriorly-accessible rotator and puller that insures that the channel blade on the blind side of the wall may be correctly oriented against the blind side of the wall relative to the exterior side mounting anchor components, whether it be the feet of the U-strap or the arms of the mounting flange 308. In this manner, proper installed alignment of the fastener openings in the feet of the U-strap or the arms of the mounting flange 308 with the fastener slots, threaded openings and/or plastic nuts on the blind side of the wall is quickly, easily and accurately obtained by the installer.

While the invention has been disclosed and described with reference to a limited number of embodiments, it will be apparent from the foregoing description and drawings that many variations and modifications may be made in the invention by those skilled in the art based upon the instant disclosure. For example, it is contemplated that the U-shaped plastic strap 302 of the fourth embodiment anchor assembly 300 may comprise conventional commercially available "wire ties" or "cable ties" which are conventionally used to secure wire bundles, cables and harnesses (and therefore not shown). Various standard and modified wire ties such as those commercially available from Great Value Industries, Inc. of Exton, Pa. may serve as an example. These are injection molded in a one-piece design from fungus-inert, self-extinguishing 6/6 nylon which remains continuously serviceable over a temperature range of 40° F. to +145° F. and are supplied in natural white or in color such as orange, and also may be obtained in an ultra-violet resistant black modification. Such wire ties are well developed in the art and various forms of the same are shown in U.S. Pat. Nos. 4,766,651; 4,735,387; and 4,705,245, as well as the remaining U.S. patents cited in the text of U.S. Pat. No. 5,112,014 (as well as in United Kingdom Patent 10052569 published Sep. 22, 1965), all of which are incorporated herein by reference. It also would be possible to use a woven wire cable but to construct the same in corrosion resistant stainless steel would be relatively expensive as compared to the constructions of the embodiments described hereinabove.

Additionally, it has been found to be important to be able to draw the blade tight against the blind side wall surface 102 while the feet 40, 42 of the U-strap or the arms 334, 336 of the mounting flange 308 are held tight against the outside surface 44 of the wall prior to drilling the lead holes for the fasteners 260, 262, or 112 and 114, etc. It is thus preferred to clamp these parts tightly in alignment for this purpose, as well as to keep the paper covering, in the case of drywall, from entangling in the drill, etc. Thus, when using the aforementioned cable tie as a substitute for both the U-strap 302 as well as for the tightening bolt 306 in the fourth embodiment 300, it is important to draw the cable tie very tight to set and clamp the blade and mounting flange pieces for this through-wall drilling operation.

Also, in many applications it is not necessary that the wall anchor be removable and reusable. In those applications the free ends of the U-strap 302 or the cable tie substitute therefor may be cut off after the wall anchor is fastened by the through-wall fasteners 260 and 262, and the cut-off strap then pushed back into the hollow of the wall construction at the blind side of the wall. However, retention of clamp-together force on the wall anchor components, as when provided by operating bolt 306 and/or tightened lock-up of a cable tie strap in the absence of holding power from the fasteners 260 and 262, is convenient, and in some cases necessary, as when fasteners 260, 262 are removed from the wall while attaching the same to mounting hardware, such as plate 120, for holding the object to be mounted on the wall by the wall anchor.

Also, it is to be understood that the holding power of the various wall anchor embodiments of the invention is generally directly proportional to the length of the blindside anchoring blade or blades. However, a length of four inches is generally considered to be the maximum usable due to the limitations on the dimensions available in standard wall construction on the blind side of the wall panel, e.g., when constructed with vertical wall studding of about three and a half inches in width dimension. Of course, if more space is available on the blind side of the wall panel, a longer blind side blade can be employed to advantage in the wall anchor constructions of the invention.

As another variation, and in lieu of the substitution of a cable-tie-type U-strap, U-strap 302 can be made self-locking by providing a row of appropriate saw teeth or buttress catch teeth along the upper or lower edge of each leg 314, 316 so that the legs may be adjustably locked by the saw teeth, as when the U-strap is fully drawn back for clamping the blade against the wall blind side surface, by having such saw teeth engage the associated or adjacent narrow edge of the slots 356 and 358 in panel 322 of mounting flange 308. Again, the excess material of such a plastic tooth-edge U-strap left protruding from the exterior side of the anchor when wall mounted could, if desired, be trimmed off with a knife, sheers, cutting pliers or the like.

It is therefore intended that such variations and modifications shall fall within the spirit and scope of the present invention as set forth in the appended claims and as limited only by the applicable prior art.

What is claimed is:

1. A fastening anchor assembly adapted for fastening an object to a first side surface of a wall or other support member having an open area on a second side surface of the wall opposite said first side surface, the wall having a hole therethrough opening at each of said surfaces and of a first specified diameter for receipt therethrough of at least a portion of said anchor assembly, said assembly comprising in combination a generally U-shaped mounting strap having a central bight portion and generally parallel first and second legs extending longitudinally from said bight portion and each terminating in a foot portion extending longitudinally generally perpendicularly from the associated leg portion in a direction away from the legs and adapted for engaging said wall first side surface, elongated anchoring blade means operably pivotally coupled to said legs for swinging motion-between a wall-hole-installation collapsed position nested against the legs adapted to enable insertion of the legs and blade means through the wall hole and a swing-out wall-mounting expanded position adapted for said blade means to clamp engage said wall second side surface with said leg feet clamp engaging said wall first side surface, and an operating threaded member operably disposed between said legs and operably threadably drivingly engaged with said blade means, said operating member having a distal end disposed for reactive force abutment with said strap bight and a head end configured for imparting rotational torque to said member such that rotation in a first direction while said distal end abuts said strap bight, after said strap legs and bight have been inserted into the wall hole to position said blade means in the open area adjacent the wall second surface, draws said blade means toward said strap feet for clamping the wall therebetween to thereby mount the anchoring assembly on the wall.

2. The anchor assembly of claim 1 wherein said blade means comprises first and second anchoring blades and a pivot nut disposed between said strap legs and pivotally hinging said blades together, said operating member being threadably engaged with said pivot nut to thereby provide the operable driving engagement with said blade means.

3. The anchor assembly of claim 2 wherein spring means are carried by said pivot nut and have oppositely extending portions in yieldable biasing engagement with said first and second blades tending to swing said blades from their collapsed position to their swung apart expanded posit ion adapted for clamping against the second side surface of the wall.

4. The anchor assembly of claim 3 wherein said U-shaped mounting strap comprises a sheet metal stainless steel strap of uniform thickness, and wherein said first and second blades each comprise a sheet metal member formed as a C-cross section channel having a center web bounded by two parallel flanges and oriented with said web facing toward said foot portions of said strap.

5. The anchor assembly of claim 4 wherein said spring means comprise a hairpin spring having multiple center convolutions encircling said pivot nut and having oppositely extending straight ends divergent therefrom and in yieldably stressed biasing engagement with said first and second blades.

6. The anchor assembly of claim 5 wherein said pivot nut is provided with diametrically opposite trunion studs journalled in cooperative pivot holes formed in said flanges of said first and second blades in portions of mutually adjacent ends thereof, said hairpin spring center convolutions encircling one of said trunion studs and being entrapped between a body of said nut and one of said blade flanges.

7. The anchor assembly of claim 2 wherein each said strap foot has a mounting hole formed therein adapted to receive a mounting screw therethrough adapted to extend through a mounting screw hole that extends between the first and second sides of the wall.

8. The anchor assembly of claim 7 wherein said web portion of each of said blades has a mounting hole adapted to coaxially register with the mounting hole in the associated strap leg foot for threaded engagement with the associated mounting screw extending through said strap leg foot mounting hole and the associated wall mounting hole.

9. The anchor assembly of claim 8 wherein said mounting screws are of the self-tapping type that self tap into the associated mounting hole in the associated web of the associated mounting blade to provide threaded engagement of said mounting screw therewith.

10. The anchor assembly of claim 1 wherein at least one of said strap legs is necked down near the end thereof adjacent said bight to provide at least one stop-pivot shoulder therealong, and wherein said anchoring blade means comprises only one anchoring blade constructed from sheet metal and having a C-channel cross section having a center web bounded by two parallel flanges, said one anchoring blade having a slot in said web portion receiving said one strap leg therethrough to mount said blade pivotally on said one strap leg, said blade web having a segment adapted to span between said strap legs with a small clearance when said blade is oriented with said web perpendicular to the legs, and wherein said web segment has a threaded mounting hole to provide the operably threaded engagement with said operating threaded member, said blade being pivotable to a position with said web parallel to said legs when said blade is moved to register said blade web slot with said shoulder portion of said strap to thereby position said one blade nested against said strap legs for insertion through the wall mounting hole.

11. The anchor assembly of the claim 10 wherein the one said strap foot extending from said one strap leg has a mounting hole provided therein and said one blade web is also provided with a mounting hole adapted to coaxially register with said one strap foot mounting hole in their wall clamping positions for receiving an associated threaded fastening member through said leg foot and web holes and through associated communicating hole in the wall.

12. The anchor assembly of claim 11 wherein said threaded fastening member is adapted to be coupled to a supporting structure of the object to be fastened to the wall to thereby take the load of mounting the object onto the wall by use of the anchor assembly.

13. The anchor assembly of 12 wherein said second strap leg foot has a hardware mounting fastener fixed thereon on the surface thereof adapted to face said first side surface of said wall in the mounted condition of said anchor assembly, said hardware mounting fastener having a threaded shaft protruding from the said second foot in a direction away from the U-strap protrusion direction and being adapted for coupling to mounting hardware for fastening the object said anchor assembly when mounted to the wall.

14. The anchor assembly of claim 10 wherein said strap legs in the portions thereof between the strap bight and said shoulders extend parallel to one another and are more closely spaced relative to one another than the portion of strap legs between said shoulders and said feet, and wherein said strap bight has a pocket formed therein to provide a rotary bearing seat for the distal end of said threaded operating member.

15. The anchor assembly of claim 1 wherein said U-shaped mounting strap has a longitudinal dimension sufficient to maintain said operating member positioned in recessed relationship between said strap legs with the head end of the operating member recessed below flush with said strap feet in all operative positions of said operating member when said anchor assembly is mounted on the wall with the wall surfaces clamped between said strap feet and anchoring blade means.

16. The anchor assembly of claim 1 wherein substantially all of the weight loading of the object to be mounted by said anchor assembly is imposed by object-engaged fastener means also engaged with said strap feet, with said wall and with said anchoring blade means independently of said threaded operating member whereby said threaded operating member is isolated from the loading forces imposed by the mounted object on the anchor assembly.

17. The anchor assembly of claim 10 wherein the other one of said strap legs is also provided with a stop-pivot shoulder so that said strap can be reversible in manufacturing assembly of said sole anchor blade on said strap leg.

18. The anchor assembly of claim 1 wherein said strap feet are formed coplanar with one another and adapted to lay flat against the exterior first side surface of the wall.

19. The anchor assembly set forth in claim 1 wherein said strap and said anchor blade means are made of stampings from stainless steel sheet metal.

20. A fastening anchor assembly adapted for fastening an object to a first side surface of a wall or other support member having an open area on a second side surface of the wall opposite said first side surface, the wall having a hole therethrough opening at each of said surfaces and of a first specified diameter for receipt therethrough of at least a portion of said anchor assembly, said assembly comprising in combination a generally U-shaped mounting strap having a central bight portion and generally parallel first and second legs extending longitudinally from said bight portion and each terminating at a free end portion, a mounting flange member extending longitudinally generally perpendicularly to the associated strap leg in a direction away from the legs and adapted for engaging said wall first side surface, an elongated anchoring blade operably pivotally coupled to said legs via apertures in said blade individually slidably receiving said legs therethrough for enabling swinging motion between a wall-hole-installation collapsed position nested against the legs adapted to enable insertion of the legs and blade through the wall hole and a swing-out wall-mounting position adapted for said blade to clamp engage said wall second side surface with said leg feet disposed adjacent said wall first side surface, said mounting flange member having a mounting hole adapted to receive the leading end of a through-wall mounting fastener therethrough for passage through the wall, said blade having a mounting nut means for fastening engagement with the leading end of the fastener member after passage through the wall, said flange member mounting hole and said blade mounting nut means being maintained oriented in coaxial alignment in the wall clamping condition of said blade and said mounting flange member by an operable coupling action orientation of said strap legs relative to said blade apertures and mounting flange member.

21. The anchor assembly of claim 20 wherein said mounting flange member comprises at least one foot portion of at least one of said strap legs and is rigidly joined thereto.

22. The anchor assembly of claim 20 wherein said mounting flange member consists of a generally planar member formed separate from said U-strap and having a pair of spaced apertures slidably receiving said strap legs individually therethrough, one leg through one and the other leg through the other of said apertures.

23. The anchor assembly of claim 20 further including an operating threaded member operably disposed between said strap legs and operably threadably drivingly engaged with said blade, said operating member having a head end configured for imparting rotational torque to said operating member such that rotation thereof in a first direction, after said strap legs and bight have been inserted into the wall hole and manipulated to position said blade in the open area adjacent the wall second surface, is adapted to force said blade toward said strap wall second surface for clamping the wall between said blade and said mounting flange member to thereby at least initially mount the anchoring assembly on the wall.

24. The anchor assembly of claim 23 wherein said through-wall mounting fastener is adapted to be coupled to a supporting structure of the object to be fastened to the wall to thereby take the load of mounting the object onto the wall by use of the anchor assembly independently of said operating member.

25. The anchor assembly of claim 24 wherein said U-shaped mounting strap has a longitudinal dimension sufficient to maintain said operating member positioned in recessed relationship between said strap legs with the head end of said operating member recessed below flush with said strap feet in all operative positions of said operating member when said anchor assembly is mounted on the wall with the wall surfaces clamped between said mounting flange member and said anchoring blade.

26. The anchor assembly of claim 24 wherein the weight loading of the object to be mounted by said anchor assembly is carried by the object-engaged mounting fastener along with said wall and said anchoring blade as engaged by said fastening member and independently of said operating member whereby said operating member and said U-strap legs are substantially isolated from the loading forces imposed by the mounted object on the anchor assembly.

27. The anchor assembly of claim 21 wherein each strap leg has an associated one of said strap feet portions, and wherein said strap feet portions are formed coplanar with one another and extend away from one another and are adapted to lay flat against the exterior first side surface of the wall.

28. Thee anchor assembly of claim 22 wherein said U-strap comprises a flexible length of plastic material forming said bight and legs and having free end portions extending through the apertures in said mounting flange member.

29. The anchor assembly of claim 28 further including an operating threaded member operably disposed between said strap legs and operably threadably drivingly engaged with said blade and said mounting flange member, said operating member having a head end configured for imparting rotational torque to said operating member such that rotation thereof in a first direction, after said strap legs and bight have been inserted into the wall hole and manipulated to position said blade in the open area adjacent the wall second surface, is adapted to draw said blade toward said strap wall second surface for clamping the wall between said blade and said mounting flange member to thereby at least initially mount the anchoring assembly on the wall.

30. The anchor assembly of claim 29 wherein said mounting flange member has a central well adapted to nest in the wall hole, and wherein said U-shaped mounting strap has a longitudinal dimension sufficient to maintain said operating member positioned in recessed relationship between said strap legs with the head end of said operating member recessed below flush with said strap feet and within the flange member well in all operative positions of said operating member when said anchor assembly is mounted on the wall with the wall surfaces clamped between said mounting flange member and said anchoring blade by screwing the operating member down tight.

31. The assembly of claim 28 wherein said U-strap has teeth along an edge of each strap leg to engage an associated edge of the associated aperture in said mounting flange member to thereby adjustably hold each strap leg against retrograde feed through the aperture when said strap is tightened to clamp said blade against said second wall surface.

32. The assembly of claim 28 wherein said U-strap comprises a conventional cable tie having a strap-like ribbed or slotted element that extends from a feed-through locking head of said cable tie that in turn contains a resilient locking pawl selectively engageable with any one of the ribs or slots of said strap like element, said cable tie strap element serving to form the legs and bight of said U-strap.

33. The assembly of claim 20 wherein said blade is of channel cross-section and carries a pair of plastic insert nuts, one disposed at each longitudinal end of the channel, providing said block nut means and adapted for self-threaded individual engagement with wood screw or metal screw threads of an associated pair of said fastening members.

34. The assembly of claim 33 wherein said plastic insert nuts are laterally captured within said blade by channel section lips of said blade.

35. The assembly of claim 34 wherein each said insert has boss means yieldable engaging a detent recess in at least one of said lips to hold said insert against sliding longitudinally of said blade.

* * * * *